US011217009B2

(12) United States Patent
von Cramon

(10) Patent No.: US 11,217,009 B2
(45) Date of Patent: Jan. 4, 2022

(54) METHODS FOR COLLECTING AND PROCESSING IMAGE INFORMATION TO PRODUCE DIGITAL ASSETS

(71) Applicant: Photopotech LLC, Marietta, GA (US)

(72) Inventor: Benjamin von Cramon, Marietta, GA (US)

(73) Assignee: Photopotech LLC, Marietta, GA (US)

(*) Notice: Subject to any disclaimer, the term of this patent is extended or adjusted under 35 U.S.C. 154(b) by 0 days.

(21) Appl. No.: 16/946,806

(22) Filed: Jul. 7, 2020

(65) Prior Publication Data

US 2021/0295592 A1    Sep. 23, 2021

Related U.S. Application Data

(63) Continuation-in-part of application No. 14/953,615, filed on Nov. 30, 2015, now Pat. No. 10,706,621.

(51) Int. Cl.
*G06T 15/50* (2011.01)
*G06T 17/10* (2006.01)
(Continued)

(52) U.S. Cl.
CPC .......... *G06T 15/506* (2013.01); *G06N 3/08* (2013.01); *G06T 15/04* (2013.01); *G06T 17/10* (2013.01); *H04N 5/2353* (2013.01)

(58) Field of Classification Search
CPC ....... G06T 15/506; G06T 15/04; G06T 17/10; G06N 3/08; H04N 5/2353
See application file for complete search history.

(56) References Cited

U.S. PATENT DOCUMENTS 6,070,093 A ‡ 5/2000 Oosta ............... A61B 5/0095
356/39
6,330,523 B1 ‡ 12/2001 Kacyra ............. G01B 11/002
250/336.1
(Continued)

FOREIGN PATENT DOCUMENTS

WO    2008127685 A1    10/2008

OTHER PUBLICATIONS

Deschaintre V, Aittala M, Durand F, Drettakis G, Bousseau A. Single-image svbrdf capture with a rendering-aware deep network. ACM Transactions on Graphics (ToG). Jul. 30, 2018;37(4):1-15. (Year: 2018).*

(Continued)

*Primary Examiner* — King Y Poon
*Assistant Examiner* — Vincent Peren
(74) *Attorney, Agent, or Firm* — Robert A. Blaha; Smith Tempel Blaha LLC

(57) ABSTRACT

Paired images of substantially the same scene are captured with the same freestanding sensor. The paired images include reflected light illuminated with controlled polarization states that are different between the paired images. Information from the images is applied to a convolutional neural network (CNN) configured to derive a spatially varying bi-directional reflectance distribution function (SVBRDF) for objects in the paired images. Alternatively, the sensor is fixed and oriented to capture images of an object of interest in the scene while a light source traverses a path that intersects the sensor's field of view. Information from the paired images of the scene and from the images captured of the object of interest when the light source traverses the field of view are applied to a CNN to derive a SVBDRF for the object of interest. The image information (Continued)

and the SVBRDF are used to render a representation with artificial lighting conditions.

10 Claims, 14 Drawing Sheets

(51) Int. Cl.
*G06T 15/04* (2011.01)
*H04N 5/235* (2006.01)
*G06N 3/08* (2006.01)

(56) References Cited

U.S. PATENT DOCUMENTS

| | | | |
|---|---|---|---|
| 6,430,371 B1 ‡ | 8/2002 | Cho | G03B 15/03 396/176 |
| 6,548,796 B1 ‡ | 4/2003 | Silvermintz | G02B 21/0024 250/201.3 |
| 6,640,130 B1 ‡ | 10/2003 | Freeman | A61B 5/0059 382/128 |
| 6,783,247 B2 ‡ | 8/2004 | White | G03B 15/10 348/E7.08 |
| 6,885,464 B1 ‡ | 4/2005 | Pfeiffer | A61C 9/00 356/602 |
| 7,057,814 B2 | 6/2006 | Boyd et al. | |
| 8,498,460 B2 ‡ | 7/2013 | Patwardhan | A61B 5/0077 382/128 |
| 8,567,955 B2 | 10/2013 | Amm et al. | |
| 8,717,564 B2 ‡ | 5/2014 | Bishop | G01N 1/12 356/364 |
| 8,731,240 B1 ‡ | 5/2014 | Woodman | G01S 17/88 382/103 |
| 9,046,415 B2 | 6/2015 | Ruh | |
| 9,078,619 B2 ‡ | 7/2015 | Panasyuk | A61B 5/0261 |
| 9,082,946 B2 ‡ | 7/2015 | Vdovin | H01L 33/60 |
| 9,091,860 B2 ‡ | 7/2015 | Read | G02B 30/25 |
| 9,165,521 B2 ‡ | 10/2015 | Yamazaki | G09G 3/3677 |
| 9,307,159 B2 ‡ | 4/2016 | Kanamori | H04N 5/2354 |
| 9,314,150 B2 ‡ | 4/2016 | Chen | G03B 15/14 |
| 9,354,185 B2 ‡ | 5/2016 | Barakat | G01N 23/04 |
| 9,354,316 B2 | 5/2016 | Larson et al. | |
| 9,510,586 B2 ‡ | 12/2016 | Hyde | A01G 22/00 |
| 9,709,987 B2 ‡ | 7/2017 | Hyde | A01G 22/00 |
| 9,894,350 B2 ‡ | 2/2018 | Cole | H04N 13/232 |
| 2002/0140905 A1 | 10/2002 | Ouchi et al. | |
| 2003/0067760 A1 ‡ | 4/2003 | Jagt | G02B 6/0056 362/606 |
| 2003/0174292 A1 ‡ | 9/2003 | White | G03B 15/10 353/74 |
| 2004/0023612 A1 | 2/2004 | Kriesel | |
| 2004/0233461 A1 ‡ | 11/2004 | Armstrong | G01S 5/16 356/620 |
| 2005/0075167 A1 ‡ | 4/2005 | Beaulieu | G07F 17/3211 463/32 |
| 2005/0257748 A1 | 11/2005 | Kriesel et al. | |
| 2005/0264800 A1 | 12/2005 | Yoshida et al. | |
| 2006/0081761 A1 | 4/2006 | Tanigawa et al. | |
| 2006/0211158 A1 | 9/2006 | Arai et al. | |
| 2007/0177136 A1 | 8/2007 | Nakano et al. | |
| 2007/0206184 A1 | 9/2007 | Uto et al. | |
| 2007/0273686 A1 ‡ | 11/2007 | Watanabe | G06T 15/506 345/419 |
| 2008/0156406 A1 ‡ | 7/2008 | Breed | G06K 7/10178 152/415 |
| 2008/0216567 A1 ‡ | 9/2008 | Breed | B60N 2/888 73/146.5 |
| 2008/0252882 A1 ‡ | 10/2008 | Kesterson | G02B 27/28 356/300 |
| 2009/0141288 A1 | 6/2009 | Nishio | |
| 2009/0226049 A1 ‡ | 9/2009 | Debevec | G06K 9/00221 382/118 |
| 2009/0273760 A1 | 11/2009 | Itoh | |
| 2010/0157252 A1 | 6/2010 | Itoh | |
| 2010/0266156 A1 ‡ | 10/2010 | Bishop | G01N 1/12 382/100 |
| 2010/0268069 A1 ‡ | 10/2010 | Liang | A61B 5/0088 600/425 |
| 2010/0289878 A1 | 11/2010 | Sato et al. | |
| 2010/0311005 A1 ‡ | 12/2010 | Liang | A61B 5/1079 433/29 |
| 2010/0321677 A1 | 12/2010 | Fukazawa | |
| 2010/0321704 A1 | 12/2010 | Kawai et al. | |
| 2011/0043806 A1 | 2/2011 | Guetta et al. | |
| 2011/0188054 A1 ‡ | 8/2011 | Petronius | B23P 11/00 356/610 |
| 2011/0206254 A1 ‡ | 8/2011 | Patwardhan | A61B 5/0077 382/128 |
| 2013/0176401 A1 ‡ | 7/2013 | Monari | H04N 13/20 348/47 |
| 2013/0242283 A1 | 9/2013 | Baily et al. | |
| 2013/0278631 A1 | 10/2013 | Border et al. | |
| 2014/0013361 A1 ‡ | 1/2014 | Monari | H04N 21/6131 725/62 |
| 2014/0092469 A1 | 4/2014 | Rassier et al. | |
| 2014/0177792 A1 ‡ | 6/2014 | Barakat | G01N 23/04 378/41 |
| 2014/0253686 A1 ‡ | 9/2014 | Wong | H04N 13/286 348/46 |
| 2014/0291480 A1 ‡ | 10/2014 | Bruder | G01S 7/4816 250/206 |
| 2014/0315330 A1 | 10/2014 | Fujimori | |
| 2015/0112136 A1 ‡ | 4/2015 | Gandjbakhche | A61B 1/303 600/111 |
| 2015/0164327 A1 ‡ | 6/2015 | Yaroslavsky | A61B 5/4872 600/476 |
| 2015/0181089 A1 ‡ | 6/2015 | Mirlay | G03B 35/10 348/46 |
| 2015/0219552 A1 ‡ | 8/2015 | Kanamori | G01N 21/21 356/369 |
| 2015/0253428 A1 | 9/2015 | Holz | |
| 2015/0256733 A1 ‡ | 9/2015 | Kanamori | H04N 5/2354 348/234 |
| 2016/0029612 A1 ‡ | 2/2016 | Hyde | A01G 22/00 701/28 |
| 2016/0029613 A1 ‡ | 2/2016 | Hyde | A01G 22/00 700/302 |
| 2016/0065947 A1 ‡ | 3/2016 | Cole | H04N 19/597 348/43 |
| 2016/0162760 A1* | 6/2016 | Skaff | G06K 9/66 382/159 |
| 2016/0241838 A1 ‡ | 8/2016 | Cole | H04N 19/597 |
| 2016/0241892 A1 ‡ | 8/2016 | Cole | H04N 19/597 |
| 2016/0253795 A1 ‡ | 9/2016 | Cole | G06T 11/40 345/426 |
| 2016/0253809 A1 ‡ | 9/2016 | Cole | H04N 13/344 345/672 |
| 2016/0275681 A1 ‡ | 9/2016 | D'Alessandro | G06T 3/4038 |
| 2016/0299057 A1 ‡ | 10/2016 | Casas | H04N 1/2191 |
| 2016/0343164 A1 ‡ | 11/2016 | Urbach | G06T 19/006 |
| 2016/0360180 A1 ‡ | 12/2016 | Cole | G06T 15/04 |
| 2016/0373734 A1 ‡ | 12/2016 | Cole | H04N 13/232 |
| 2017/0060131 A1 ‡ | 3/2017 | Hyde | A01G 22/00 |
| 2017/0074652 A1 ‡ | 3/2017 | Send | G01J 3/502 |
| 2017/0155852 A1 | 6/2017 | von Cramon | |
| 2017/0323472 A1 ‡ | 11/2017 | Barnes | G06T 15/08 |
| 2017/0359564 A1 ‡ | 12/2017 | Cole | H04N 19/597 |
| 2018/0070819 A1 | 3/2018 | Kanamori et al. | |
| 2018/0234676 A1 ‡ | 8/2018 | Cole | H04N 17/002 |
| 2018/0303406 A1 | 10/2018 | McKinney et al. | |
| 2019/0347526 A1* | 11/2019 | Sunkavalli | G06K 9/46 |

OTHER PUBLICATIONS

Li Z, Xu Z, Ramamoorthi R, Sunkavalli K, Chandraker M. Learning to reconstruct shape and spatially-varying reflectance from a single image. ACM Transactions on Graphics (TOG). Dec. 4, 2018;37(6):1-1. (Year: 2018).*

Kondo, Yuhi, Taishi Ono, Legong Sun, Yasutaka Hirasawa, and Jun Murayama. "Accurate polarimetric BRDF for real polarization

(56) References Cited

OTHER PUBLICATIONS scene rendering." In European Conference on Computer Vision, pp. 220-236. Springer, Cham, 2020. (Year: 2020).*

Deschaintre, Valentin, Yiming Lin, and Abhijeet Ghosh. "Deep Polarization Imaging for 3D Shape and SVBRDF Acquisition." Proceedings of the IEEE/CVF Conference on Computer Vision and Pattern Recognition. 2021. (Year: 2021).*

Anonymous, Polarization (waves)—Wikipedia, the free encyclopedia, as found at http://en.wikipedia.org/wiki/ Polarization_(waves) on Nov. 20, 2015, pp. 1-20.‡

Hershberger, Wil, Taming Those Annoying Highlights: Cross-Polarization Flash Macro Photography, NatureScapes.net—The Resource for Nature Photographers, as found at http://www.naturescapes.net/articles/techniques/taming-those-annoying-highlights-cross-polarization-flash-macro-photography/ on Nov. 3, 2015, pp. 1-3.‡

He et al.; "Polarization-Based Imaging Basics and Benefits" Photonics Spectra, Jul. 2016, pp. 1-12 (Year: 2016).

Li, Z. et al.; "Materials for Masses: SVBRDF Acquisition With a Single Mobile Phone Image," pp. 1-26; Apr. 16, 2018; arXiv:1804.05790v1 [cs.CV].

Hershberger, W.; Taming Those Annoying Highlights: Cross-Polarization Flash Macro Photography, Naturescapes.net—the Resource for Nature Photographers, as found at http://www.naturespaces.net/articales/techniques/taming-those-annoying-highlights-cross-polarization-flas-macro-photography/ on Nov. 3, 2015, pp. 1-3.

\* cited by examiner
‡ imported from a related application

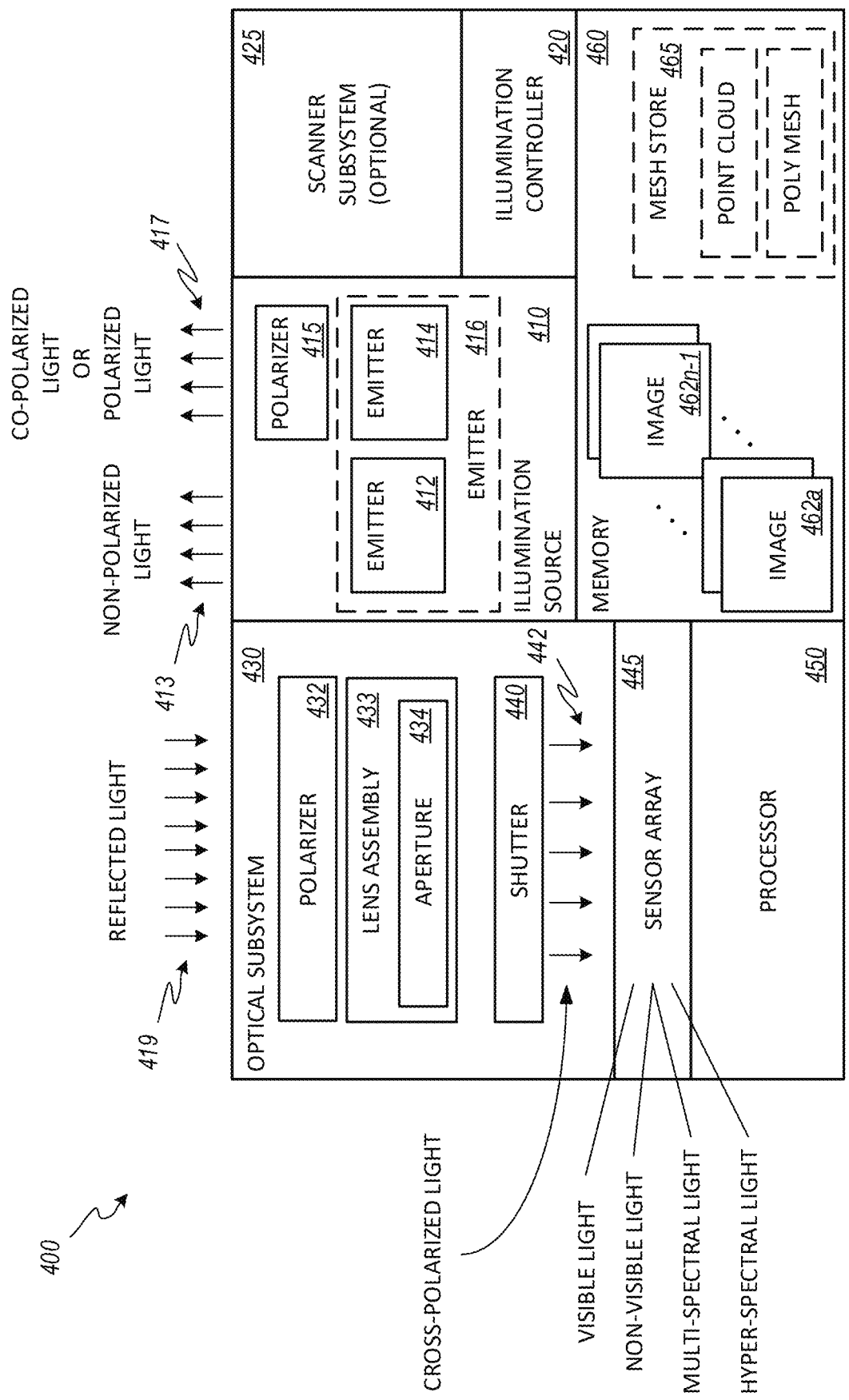

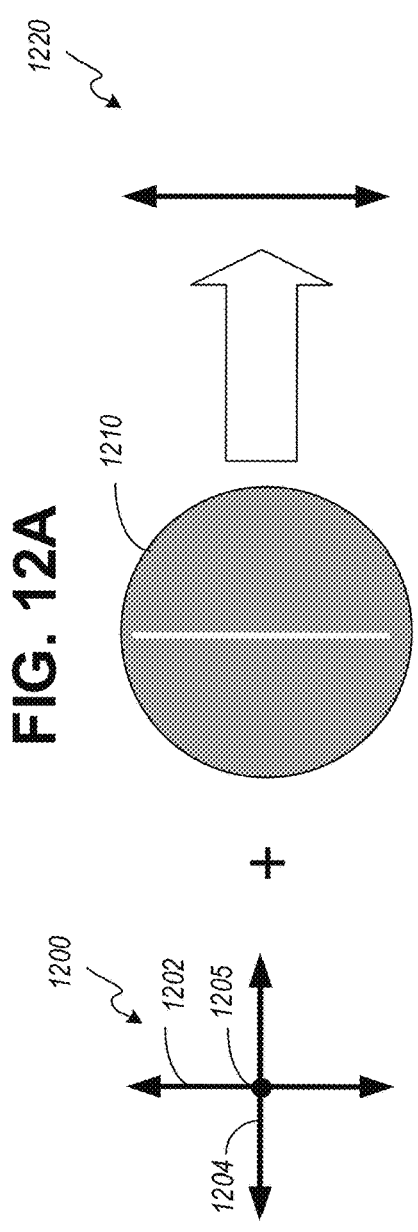
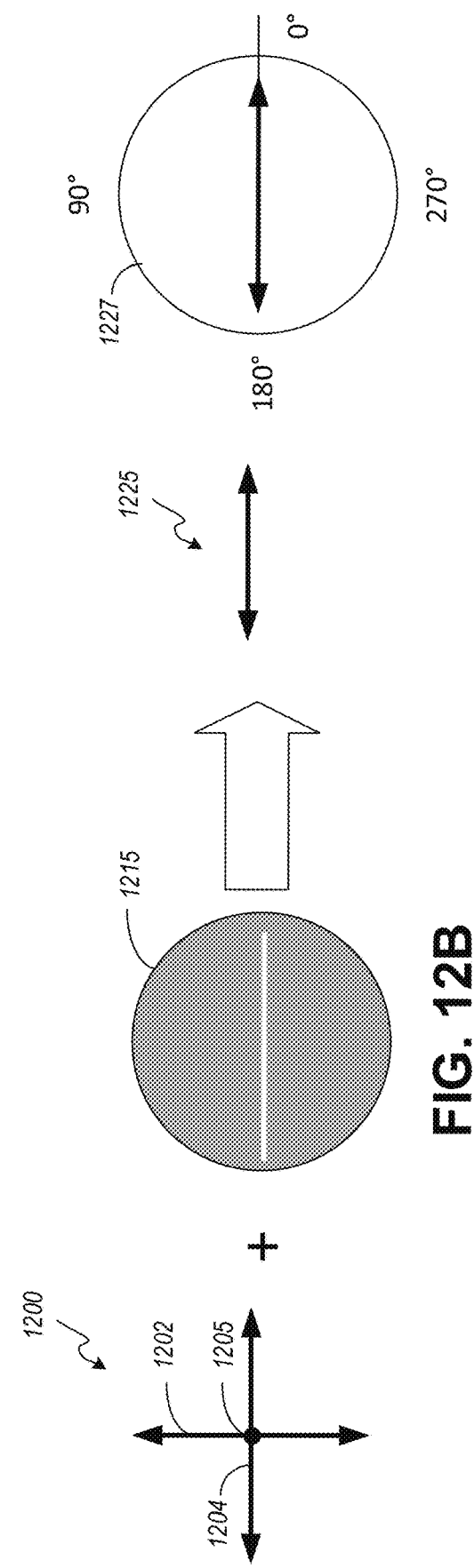

METHODS FOR COLLECTING AND PROCESSING IMAGE INFORMATION TO PRODUCE DIGITAL ASSETS

TECHNICAL FIELD

This invention relates, in general, to photography, photogrammetry and textured models used for generating a three-dimensional representation of subject matter outside a studio.

BACKGROUND

Photogrammetry-derived virtual environments for use in virtual reality (VR), museum exhibits, video games, and digital cinema are limited to scenes featuring fixed light sources, such as the sun which, in the context of this application, is relatively fixed, and artificial lights. Since photogrammetry relies on sequences of overlapping photos taken from slightly converged angles, the implication is that fixed lighting sources produce shadows, specular reflections and for some materials sub-surface reflections that obfuscate the true color and surface features over portions of items in a scene. Fixed light sources can similarly affect data captured using other scanning methodologies.

Studio-based techniques for modeling objects are well-known. To date, such methods introduce an item before an image capture system bound to a location such as a studio or factory floor where an array of cameras and controlled artificial light sources, such as softboxes, light domes, light projectors, etc., are placed around the object.

For example, techniques for modeling layered facial reflections consisting of specular reflectance, single scattering, shallow and deep sub-surface scattering from the skin of a human face are illustrated and described in U.S. Patent Application Publication Number 2009/0226049 A1 to Debovec et al. (hereinafter referred to as Debovec). Parameters for appropriate reflectance models are derived from 20 photographs recorded in a few seconds from a single viewpoint in a studio environment. Debovec introduces image capture systems that use a plurality of light sources with controllable output intensities to produce spherical gradient illumination patterns of a person's face. Both the subject-of-interest and the light sources are stationary and generally limited to the confines of a studio. Polarizing filters are arranged adjacent to the light sources to polarize the light from the light sources in a desired orientation. The system includes two or more cameras with a desired polarization adjusted manually. A light projector is added to illuminate a desired portion of a person's face. An image processing system receives specular reflectance and diffuse reflectance data from the cameras and calculates reflectance for the facial image based on a layered facial reflectance model. The systems and methods disclosed by Debovec are resource intensive and impractical for capturing images and constructing models of scenes in a non-studio environment.

Images of real-world environments captured during daytime hours present challenges due to the presence of continuous sunlight, the possible presence of ambient light from artificial sources and flash sources when used. Light from each of these sources combines under some operational conditions. Artificial light is affected by its respective inverse square distance from a subject-of-interest, while sunlight is not. The contribution from a flashtube or flashlamp, which releases light energy over milliseconds, is mostly unaffected by shutter speed. However, a camera operator subsampling a continuous light source such as the sun or light from an artificial light fixture, when working from a non-stationary platform, can adjust shutter speed until the shutter is fast enough so as not to introduce issues with temporal resolution.

Ambient continuous light from the sun and fixed and unfixed light fixtures separate from a camera, will necessarily introduce fixed shadows in captured images, which are problematic to the development of virtual environments requiring computer graphics (CG) lighting. In the case of a continuous artificial light source, such as a light-emitting diode (LED) based strobe, which continues to release light energy for as long as a power supply can continue to provide sufficient input power, a slower shutter speed enables more light to contact a photosensitive array but with an increased likelihood of loss of temporal resolution for freestanding cameras.

To appear realistic, a virtual environment, even in the presence of simulated fixed light sources and fixed shadows, ideally adapts to changes in the perspective of the observer relative to the scene. Specifically, specular information should change relative to changes between the observer and reflective surfaces of objects in the scene. Specular reflections are typically simulated with a diffuse albedo shader in a layered arrangement under a specular roughness shader, in the vernacular of physical based rendering or PBR. As disclosed by Debovec, additional layers can be included to simulate subsurface scattering of light in partially translucent materials.

Images of real-world environments captured during night time hours still present challenges when ambient light from artificial sources and flash sources are used to illuminate a scene. Known artificial lighting techniques for minimizing shadows in captured images outside of a studio are problematic for a number of reasons. Generally, there is difficulty in transporting, locating, coordinating and energizing artificial light sources outside a studio environment. Consequently, it is often the case that the combination of natural and artificial light provides insufficient light to accommodate adequate surface-of-interest coverage because of distance, light absorption or both. Under insufficient light conditions, a photographer will increase exposure times and aperture and if possible, move closer to the surface-of-interest. However, these longer exposure times necessitate the use of tripods to stabilize the camera position. When thousands of images may be required to map a real-world scene, it is impractical to closely position a camera to a surface-of-interest, capture an image, then relocate and adjust a tripod to position the camera for each subsequent exposure necessary to capture a real-world scene.

To avoid the inconvenience and effort of transporting and positioning a tripod for each exposure, one or more artificial light sources, such as strobes, can be synchronized to a shutter mechanism to a minimum of about $\frac{1}{125}$th of a second for focal plane shutters on most digital single lens reflex (DSLR) cameras. However, photography dependent on artificial lighting capable of anything less than millisecond enabled strobe lighting, e.g., ambient light from the sun and fixed and unfixed light fixtures, will introduce shadows in the captured images.

A conventional and portable solution for reducing shadows is described in U.S. Pat. No. 6,430,371 to Cho (hereinafter referred to as Cho), which integrates a ring light guide with a camera. The guide includes a housing attached to the camera by way of an adapter insertion hole having an axis that is coaxial with the lens of the camera. The ring light guide irradiates light toward an object in a direction that is substantially aligned with an axis of the lens of the camera.

Cho further describes adjusting the amount of light irradiated to the object dependent upon a camera to object distance. However, the combination disclosed by Cho is limited to objects that are close to the lens. Cho fails to show a combination that addresses light loss from cross-polarization that would apply to the capture of subject matter that may be beyond a few feet away from the lens.

While an on-axis light source minimizes shadows, an on-axis light source exacerbates specular reflections. Prior art techniques for reducing specular reflection use cross-polarization filters. That is, placing a first polarizer on the light source at 90° with respect to a second polarizer on the lens. However, the loss of through light with thin-film polarizers leads to a combined filter factor of upwards of 3.5 f-stops of available light at the image sensor. The f-number, f-stop number or relative aperture is a dimensionless ratio of the focal length of a lens to the diameter of the aperture. The f-stop number provides a quantitative measure of lens speed. A doubling of the f-stop number halves the size of the aperture. Consequently, each f-stop represents a doubling or halving of the light depending on whether the aperture adjustment is increasing or decreasing the size of the opening. Thus, the use of cross-polarization introduces difficulties in providing sufficient illumination over a practical image area and separation distance between a subject or subjects of interest in a non-studio environment and the camera to achieve an adequate exposure at practical shutter speed, sensitivity and aperture settings.

The advent of convolutional neural networks (CNNs) has introduced a means of recovering the reflectance properties of materials present in a scene. The recovered reflectance properties may be used for texturing a three-dimensional model of the scene. With PBR broadly accepted industry-wide as the state of the art in relighting of virtual objects and environments, providing for diffuse albedo, specular roughness, and normal map requires solving for the spatially varying bi-directional reflectance distribution function (BRDF) of materials, a processor-intensive endeavour benefitting from CNNs. Furthermore, research papers delineating various approaches involving CNNs are paired with a variety of approaches to material acquisition. Material acquisition overlaps with volumetric capture when the latter includes individual and fusion scanning systems providing for the recording of texture information. An emphasis on a lightweight approach to material acquisition is motivated by interest in a broad range of applications coupled with ease of use. Post-processing techniques using CNNs vary with the types of lighting conditions present during image acquisition that are leveraged for providing various texture information. It is those lighting conditions informing material acquisition that beg to be compared to what is afforded by individual and fusion scanning systems, there being trade-offs worth considering when confronting the non-trivial challenge of solving for a spatially variable BRDF in large scale environments containing a myriad of complex materials. This holds true under one or both of various uncontrolled ambient lighting conditions which may be dependent upon location, time, weather, and other factors and controlled lighting conditions.

Among the various lightweight approaches to material acquisition, a common theme includes leveraging ambient lighting to absolve the user from providing ample artificial illumination of the right type. Because the various CNNs deployed downstream are geared at teasing out constituent texture information from ambiently lit photography, the problem of entanglement between diffuse albedo and specular roughness as recorded in source imagery is deemed acceptable, given the gain to broad applications with lightweight material acquisition. In many cases CNNs use as an input a single image of a scene under ambient lighting. Since ambient lighting predicts a range of lighting effects on a range of materials and surface topology, such a system is constrained by the potential for hard shadows and strong specular reflections in a source image requiring CNNs to hallucinate the missing information. Both diffuse albedo and specular roughness material properties hide in hard shadows, and diffuse albedo hides under specular roughness in direct light. Li et al. (Materials for Masses: SVBRDF Acquisition with a Single Mobile Phone Image; submitted to the European Conference on Computer Vision, 16 Apr. 2018; https://arxiv.org/abs/1804.05790 [cs.CV]) uses the onboard flash on a common smartphone to fill shadows and to provide known lighting conditions, such as angle, color temperature, beam spread, and falloff, used by the CNNs to help train predicted material properties otherwise lit only by unknown ambient lighting conditions. While superior results are obtained with shorter processing times, it is noted that this lightweight solution to material acquisition, while supporting broader applications, is not ideal for higher end specialized applications requiring greater output, such as working in larger volumes where the falloff of light thwarts accurate material acquisition. The physical limitation of having to maintain relatively close distances from a mobile phone camera to a subject of interest, renders acquisition as taught by Li et al. overly impractical for outdoor landscapes and large venues with objects outside of the range of the light provided by the mobile phone.

While a CNN, as deployed by Li et al., is able to hallucinate missing texture information in rendering a believable image, the effectiveness predictably only extends so far. Sample materials and shapes only indicate functionality in close proximity to highly planar surfaces, leaving it open to question at what point will hallucinated information fall short of believability. When acquisition operates at increased working distances capture system to subject matter, poor believability is predictably encountered sooner, as a given field of view takes in and has to account for a greater volume of potential materials and respective surfaces, with yet greater complexity in lighting conditions coming into play. If the onboard flash on a mobile phone yet suffices to provide ample illumination, especially true in larger interior spaces, be they fully light-denied like caves or mines, or in environments where ambient lighting alone is insufficient, the beam spread of an onboard flash on a mobile phone, or from any on-board light source, is invariably center-weighted resulting in a hotspot. That is, no matter the light output, adjusting exposure for the center of the frame throws levels at the periphery of the frame into low signal/noise ratios. While subject matter in Li's research features highly planar surfaces like ceramic tiles, these facing the camera to receive relatively even lighting across the full surface, capture in large scale environments involves photos of complex scenes involving any number of shapes, planar and non-planar, seen from all manner of perspectives, from highly converged to straight on. Oblique normals, camera-facing normals, and everything in between act to further constrain the efficiency and effectiveness of a CNNs ability to disentangle diffuse albedo from specular roughness in solving for spatially varying BRDF. While high dynamic range or HDR photography holds promise in overcoming this challenge for a small handful of photos, it's highly impractical to implement when applied to photogrammetric capture of large-scale scenes involving hundreds or even many thousands of exposures.

Ren et al. (Image Based Relighting Using Neural Networks; submitted to ACM Trans. Graph. 34, 4, Article 111 (August 2015); https://dl.acm.org/doi/pdf/10.1145/2766899 [cs.CV]) uses a slightly less lightweight approach to material acquisition and involves training CNNs with photos sampling a stationary scene illuminated by moving point and linear lights in 2D and 3D light domains. Light probes placed in the scene are used to position the light sources per exposure, coherence-based methods then model light transport functions with neural network ensembles to render high-quality reconstructions. Sampling various light positions in a 2D or 3D light domain arguably holds the strongest promise for reflectance estimation, especially for high-frequency specular information associated with micro-facets, so often seen in rocks and sand featuring quartzite and felspar, for the variety of metals, for dielectric materials like iridescent butterfly wings, as well as for estimating refraction and complex lighting effects such as caustics when dealing with translucent and transparent materials like a water-filled glass vase. That said, what's gained in the relatively lightweight approach to material acquisition at this advanced level with use of a still camera on a tripod yet fall short of a practical solution to reflectance and refraction estimation when applied to volumetric capture of large scale environments containing a myriad of complex materials, a more specialized application. For more specialized applications like science, entertainment, education, virtual tourism, VR industrial training, the list goes on, a hybrid solution leveraging CNNs with scanning or fusion-scanning systems awaits a solution.

SUMMARY

One example embodiment includes a method for processing image information, the method includes receiving a first data set representative of a cross-polarized image of a scene, wherein subject matter is illuminated to substantially avoid shadows in the cross-polarized image to provide a diffuse albedo surface texture; receiving a second data set representative of a co-polarized image of substantially the same scene illuminated to substantially avoid shadows in the co-polarized image; and using the first and second data sets to train a convolutional neural network configured to derive a spatially varying bidirectional reflectance distribution function (SVBRDF) representative of one or more materials in the scene, wherein the SVBRDF is used to produce a refined diffuse albedo surface texture and a specular roughness surface texture.

Another example embodiment includes a method for processing image information, the method includes receiving a first data set representative of a cross-polarized image of a scene, wherein subject matter is illuminated to substantially avoid shadows in the cross-polarized image to provide a diffuse albedo surface texture of objects in a field of view; receiving a second data set representative of a co-polarized image of substantially the same scene illuminated to substantially avoid shadows in the co-polarized image; receiving a third data set representative of images of substantially the same scene wherein subject matter including at least one light probe in the field of view is illuminated with a repositioned light source between a first location and a second location such that some portion of a first line defined by the first location and the second location intersects the field of view, the images in the third data set sampling reflections cast from the at least one light probe and subject matter with surfaces of interest as the light source traverses a path; and using the first and second data sets in combination with the third data set to train a convolutional neural network configured to derive a spatially varying bidirectional reflectance distribution function representative of subject matter in the scene to produce a refined diffuse albedo surface texture and a specular roughness texture.

OVERVIEW OF EMBODIMENTS

In the following, further exemplary embodiments of the present invention will be explained.

In generating photorealistic models of complex real world environments the image capture system is charged with providing a post-processing workflow digital assets containing data that is both useful to a photogrammetry engine employed to solve for geometry in scene reconstruction and provide usable texture data allowing a lighting and rendering engine to realistically simulate the diffuse color and specular reflectance of surface materials. Both objectives, geometry and texture, are best served by controlling polarization states of the lighting in the source photography.

The image capture device is configured to produce lighting for separately recorded exposures that are co-polarized and cross-polarized per image pair. The cross-polarized exposure contains only diffuse color information that is substantially shadow-free, and the co-polarized exposure contains diffuse color with specular reflections and is also substantially shadow free.

As described subsequently in further detail a separate light source is provided for illuminating complex surfaces such as those belonging to unique objects or structures within a scene. The separate point or linear light source may be supported by a hand, boom, wire, a rail or track, a vehicle including unmanned airborne vehicles, etc. Various filters, reflectors, etc. may be fixed to or controllably applied as may be desired to direct and/or modify a characteristic of the light cast onto the objects present in a scene.

As indicated, macro photographic techniques generally cannot be applied to adequately illuminate and capture subject matter in real environments. An exposure captured as a result of such techniques fails to evenly illuminate a subject over the entire image plane. As further indicated, portable light sources introduce undesired shadows that obfuscate diffuse color and surface texture of items in a real-world scene that is assembled from photographs. In addition, conventional image processing techniques do not provide sufficient information in a model that can be used to generate realistic specular reflectance under changing lighting conditions in a virtual environment. Moreover, conventional portable photogrammetry includes no solution for capturing subsurface scatter in a model that can be used to support CG lighting in a virtual environment representing a real-world location. In light of the above shortcomings, improvements are desired.

The phrase "ambient light" as used herein means electromagnetic radiation from both natural and artificial sources that are not controlled by a camera or controller associated with a camera.

The phrase "artificial light" as used herein means electromagnetic radiation from man-made sources.

The word "bake" or the act of "baking" as used herein means an operation that applies data in an algorithm that when executed performs a post-capture image process that fixes the applied data in a new form.

The phrase "binned sensor" as used herein means an image sensor where electrical signals from two or more adjacent pixels are sampled together.

The word "camera" as used herein means a device for recording images.

The phrase "camera orientation" as used herein means the sensor orientation in an image capture system at the time of an exposure however or whenever determined.

The phrase "camera projector" as used herein means data identifying a corresponding surface texture and camera orientation. These inputs are used in camera projection mapping to apply appropriate information from a surface texture to generate a corresponding projection map.

The phrase "camera projection mapping" as used herein means an image processing operation that generates projection maps from inputs received from a photogrammetry engine and at least one surface texture.

The phrase "cinematic production" as used herein means a man-made creation of or relating to motion pictures however embodied or distributed.

The word "color" as used herein means the set of physical properties of an object, namely electromagnetic radiation absorption, reflection or emission spectra.

The phrase "controlled light" as used herein means electromagnetic radiation generated by a light source under the influence of an input.

The phrase "convolutional neural network" as used herein is a computing system inspired by a biological neural network that includes one or more convolution layers.

The term "co-polarization" as used herein means emitting electromagnetic radiation from a controlled source in a first polarization angle and receiving reflected electromagnetic radiation at an imaging sensor in the same polarization angle.

The phrase "co-polarized exposure" as used herein means the act of introducing electromagnetic radiation as determined by shutter speed and lens aperture from a controlled source in a first polarization angle and receiving reflected electromagnetic radiation at an imaging sensor in the same polarization angle where the imaging sensor converts the incident electromagnetic radiation to electrical signals in accordance with a present image sensor sensitivity.

The term "cross-polarization" as used herein means emitting electromagnetic radiation from a controlled source in a first polarization angle and receiving reflected electromagnetic radiation at an imaging sensor in a second polarization angle shifted +/−90° from the first polarization angle.

The phrase "cross-polarized exposure" as used herein means the act of introducing electromagnetic radiation as determined by shutter speed and lens aperture from a controlled source in a first polarization angle and receiving reflected electromagnetic radiation at an imaging sensor in a second polarization angle shifted +/−90° from the first polarization angle where the imaging sensor converts the incident electromagnetic radiation to electrical signals.

The phrase "dense surface mesh" as used herein means a data set representing planar surfaces defined by lines connecting the vertices or locations in the point cloud.

The phrase "diffuse color" as used herein means the set of physical properties of a subject or subjects of interest as visually perceived by reflection equally in all directions. Visually, this is the dull not shiny color isolated from specular reflections.

The phrase "diffuse-surface texture" or "diffuse albedo surface texture" as used herein means a two-dimensional data set that includes diffuse color from one or more cross-polarized exposures or as refined by CN Ns.

The phrase "diffuse-projection map" as used herein means a two-dimensional digital asset created by a projection mapping operation in response to a diffuse surface texture or a diffuse albedo surface texture, a camera projector and a UV map as inputs.

The phrase "digital asset" as used herein means data which is applied in an imaging process in a defined workflow.

The word "exemplary" as used herein means serving as an example, instance, or illustration. Any aspect described herein as "exemplary" is not necessarily to be construed as preferred or advantageous over other aspects.

The word "exposure" as used herein means the act of introducing electromagnetic radiation as determined by shutter speed and lens aperture to a sensor that converts the incident electromagnetic radiation to electrical signals in accordance with an image sensor sensitivity.

The word "freestanding" as used herein means not supported physically by a fixed structure or fixed object beyond a chassis or enclosure.

The term "hyper-spectral" as used herein means an image sensor that generates separate electrical signals in response to electromagnetic radiation incident at the sensor in many frequency bands across the electromagnetic spectrum. Frequency bands are not necessarily continuous and do not necessarily include frequencies visible to a human observer. When compared to the frequency bands of a multi-spectral sensor, the frequency bands of a hyper-spectral sensor are smaller and greater in number.

The phrase "incident light" as used herein means electromagnetic radiation from any source that contacts a surface.

The phrase "invisible light" as used herein means electromagnetic radiation from any source that includes frequencies that are not detected by the eye-brain system of a typical human observer.

The phrase "image-capture system" as used herein means an apparatus that in a first mode of operation temporarily stores images responsive to cross-polarized light received from a surface or surfaces controllably illuminated in succession wherein one of the images is the result of controlled illumination of non-polarized light and the remaining image is the result of controlled illumination of polarized or co-polarized light while in a second mode of operation temporarily stores a sequence of images as a separate light source traverses a field of view.

The phrase "image-processing system" as used herein means an apparatus that receives images however illuminated of substantially the same scene and uses one or more repetitive and/or iterative data manipulations to generate a modified image or another data asset that is stored for use in generating a representation of a scene from a model in conjunction with information from the images.

The phrase "isolated-specular surface texture" as used herein means a two-dimensional data set from a subtraction operation between corresponding color data values from a diffuse albedo surface texture and a diffuse albedo plus specular surface texture.

The phrase "isolated-specular projection map" as used herein means a two-dimensional digital asset created by a projection mapping operation in response to an isolated-specular or specular roughness surface texture, a camera projector and a UV map as inputs.

The word "light" as used herein means electromagnetic radiation both visible and non-visible to a human observer.

The term "multi-spectral" as used herein means electromagnetic radiation in at least four specific frequency bands. As used herein the specific frequency bands are not necessarily adjacent to one another may or may not overlap one another and may include frequencies visible to a human observer as well as frequencies non-visible to a human observer. When compared to the frequency bands of a hyper-spectral sensor, the frequency bands of a multi-spectral sensor are larger and fewer in number.

In the context of this disclosure "natural light" means electromagnetic radiation from bioluminescence, substances that have been heated including substances that are combusting, substances that have not been heated, and non-Earth celestial sources.

The phrase "orientation" as used herein means the location and direction in a three-dimensional coordinate system of an image capture system.

The word "photogrammetry" as used herein means the science of making measurements from photographs.

The phrase "physically based rendering" is an approach in computer graphics that seeks to render information in a way that accurately models the flow of light under real conditions.

The word "polarizer" as used herein means a filter that substantially reduces the passage of electromagnetic radiation in other than a desired plane.

The phrase "point cloud" as used herein means a data set representing locations in a three-dimensional space.

The term "light probe" as used herein means a dark glossy sphere that reflects hard specular reflections.

The word "project" as used herein is the act of causing electromagnetic radiation originating from a source other than the illumination source (e.g., an optional scanner subsystem) to contact a surface or surfaces of one or more objects in a real-world scene.

The word "projection" or the act of "projecting" as used herein means an operation that applies data in an algorithm that when executed performs a post-capture image process that combines color information from a two-dimensional data set over a surface defined by a three-dimensional model.

The phrase "reflected light" or "albedo" as used herein means electromagnetic radiation from any source that is cast back from a surface or sub-surface.

The phrase "render mesh" as used herein means a data set representing a three-dimensional model of an environment.

The word "sensor" as used herein means an array of picture elements that generates electrical signals in response to electromagnetic radiation incident at the corresponding picture elements.

The phrase "sensor orientation" as used herein means the location and direction in a three-dimensional coordinate system of an image sensor in an image capture system at the time of an exposure.

The word "shader" as used herein means an algorithm that when executed performs a post-capture image process.

The phrase "spatially variable bidirectional reflectance distribution function" as used herein means a 6-dimensional function, $f_x(w_i, w_r, x)$, where, $w_i$ is a vector that points toward the light source from x; $w_r$ is a vector that points toward the viewer (camera) from x; and x describes a two-dimensional location over an object's surface.

The phrase "specular color" as used herein means the set of physical properties of an object as visually perceived via reflection when the object is illuminated by electromagnetic radiation from a source defined by intensity, frequency, distance, and an angle of incidence relative to the normal surface of an object.

The phrase "specular-surface texture" as used herein means a two-dimensional data set that includes specular color from one or more co-polarized exposures or non-polarized exposures.

The word "studio" as used herein means a room where a photographer or videographer works.

The phrase "UV map" as used herein means a two-dimensional digital asset including data values representing intensity over one or more corresponding electromagnetic radiation frequency ranges that is shaped to correspond to a three-dimensional surface. A UV map is a product of a three-dimensional mapping process, such as photogrammetry that corresponds to a surface geometry.

The phrase "virtual camera" as used herein means the location and direction in a three-dimensional coordinate system of a virtual observer in a virtual environment together with parameters that adjust how the virtual environment is represented.

The phrase "virtual environment" as used herein means surroundings or conditions including at least a display representative of a real-world scene. While virtual environments in other contexts can be entirely artificial and representative of things unknown and unnatural, in the context of this disclosure virtual environments have a basis in images captured from a real-world scene.

The phrase "virtual light source" as used herein means information related to one or more of relative location from an origin, luminous flux, and frequency that changes one or more characteristics of the subject matter in the virtual environment.

The phrase "visual effect" as used herein means imagery created or manipulated outside the context of live action.

Independent of the application, whether for rendering virtual environments for use in creating or editing a visual effect for broadcast television, cable television, Internet streaming, digital cinema, animations, VR, or video games, dynamic virtual or CG lighting benefits from having as a starting point nearly pure or diffuse color data in a separate channel from that associated with specular color data. The separation of diffuse color data from specular color data enables an image processor to render more realistic representations of a virtual environment when lighting conditions and/or viewer perspective change.

When a light source moves in the real world an observer sees shadows and specular reflections change accordingly. Similarly, when an observer moves in the real world, specular reflections and in the case of partially translucent materials, subsurface scatter changes from the perspective of the observer. Accordingly, it is a benefit when moving a virtual light in a virtual environment for an observer to see shadows and specular reflections shift in accordance with changes in the location and orientation of the virtual light source. Likewise, when the perspective of the virtual observer is changing it is further beneficial for specular reflections, and in the case of translucent materials, for the behaviors of subsurface scatter to change in the virtual representation.

The present methods combine substantially shadow-free lighting with photography to capture surface textures that isolate diffuse color data from specular color data. A set of diffuse albedo surface textures are used with conventional photogrammetry techniques to generate a model of a real-world location or scene. Matched images or images of substantially the same subject matter exposed under different lighting conditions are used to generate a modified image. This modified image or specular roughness surface texture is used as a separate input when rendering a virtual environment from the model. Accordingly, a set of exposures captured at a location are temporarily stored as image files and processed using an image-processing technique to generate the modified image.

The present methods include steps for exposing and temporarily storing image pairs with an improved image-capture system. The paired images are captured in quick succession under separate controlled lighting conditions. The surface or surfaces of interest at a location to be modeled are illuminated by a light source that provides sufficient light under different polarization states to adequately expose photosensitive elements in an image sensor. That is, the light source provides sufficient light over a greater distance between the illumination source and the subject-of-interest.

In addition, light emitted from the improved image-capture system substantially reduces and for some textures virtually eliminates shadows in the color information of the image pairs. An illumination source and controller operate in response to one or more signals from the image-capture system to illuminate a surface or surfaces of interest with a first polarization state and at a designated power level such that reflected light incident at an optical subsystem of the image-capture system passes through an open shutter and reaches the image sensor where the light is converted to electrical signals that are temporarily stored in an image file. This first exposure is quickly followed by a subsequent exposure where the illumination source and controller illuminate the same surface or surfaces of interest with light having a second polarization state and power level different from the first polarization state and power level. The first polarization state and the second polarization state are examples of a desired polarization state.

For example, when a polarizer is absent between an illumination source and a subject-of-interest, a relatively lower illumination power is provided to illuminate the subject-of-interest during one of the paired or related image exposures. When a polarizer is introduced between an illumination source and a subject-of-interest, a relatively larger illumination power is provided to illuminate the subject-of-interest (e.g., a surface or surfaces) during the remaining one of the paired image exposures.

The elapsed time between a first exposure and a second exposure or subsequent exposure is controlled by the image-capture system operating in synchronization with the illumination controller as well as in coordination with the various electro-mechanical and optical subsystems. Independent of the sequence, a first exposure is the result of illumination of a subject-of-interest illuminated as the result of a first illumination power and a second exposure is the result of illumination of substantially the same subject of interest illuminated as the result of a second illumination power where the second illumination power is not necessarily the same as the first illumination power. In some embodiments, the illumination controller may be arranged to electronically enable or adjust a polarizer arranged in a path between a controlled light source and the scene-of-interest. Such an electronically enabled adjustment may be applied to leverage the entire amount of available light.

In a preferred embodiment, whether the two exposures are co-polarized or cross-polarized, reflected light reaches the sensor in both exposures, and absent very fast relative movement between the subject matter being imaged and the image-capture system, the paired images include substantially the same subject matter across the raster of pixels stored in separate image files.

In an alternative embodiment, an image-capture system could be arranged with paired cameras. In such an arrangement a single camera orientation would apply to the image pairs and would provide optimal inputs for a difference blend operation to isolate specular reflections from diffuse color. A single emitter could be used in conjunction with a film polarizer to illuminate a subject-of-interest with polarized light. A first camera may receive the reflected light after it is further redirected by a beam splitter. A second or "through-path" camera is provided after the beam splitter. A polarizer may be provided before the image sensor in the through-path camera to partially balance the incident or reflected light lost in the beam splitting process. The use of multiple image sensors and a beam splitter increases production costs and design complexity and likely introduces a calibration to balance the corresponding image pairs. However, if the image sensors shifted out of alignment, a global fix could be applied to the paired images.

Images that include subject matter that was captured with a cross-polarized lighting condition or a cross-polarized exposure provide a first two-dimensional data set or diffuse albedo surface texture that includes substantially shadow-free diffuse color. The image information stored as a result of the cross-polarized exposure is substantially shadow free when the reflected light from a controlled light source is nearly on-axis with the sensor that captures the cross-polarized image. In addition, the cross-polarized exposure or the image that results from such an exposure is substantially free of specular color or the shiny color that results from reflectance that is free of specular color. At one end of the spectrum, the more obvious example of specular color is the shiny color in an image that results from reflectance off of highly smooth surfaces. Such an image includes no discernible bright or shiny spots generally white in color that result from a mirror-like reflection of a broad range of the visible spectrum that encounters a surface or surfaces captured in the image. Specularity and roughness represent both sides of the same coin, such that an image illuminated with cross-polarized light contains far more subtle effects whenever less shiny/non-matte surfaces reveal diffuse color otherwise hiding beneath lower levels of specular reflectance.

Images that include subject matter captured with a co-polarized lighting condition or co-polarized exposure provide a separate two-dimensional data set or specular roughness surface texture with substantially shadow-free specular color. The image information stored as a result of the co-polarized exposure is substantially shadow free when the reflected light from a controlled light source is nearly on-axis with the sensor that captures the co-polarized image. The paired images are stored in a memory in the improved image-capture system.

The present methods can be adapted and applied to images captured of real-world scenes under controlled lighting conditions managed by a freestanding image-capture system. Such a freestanding image-capture system may be hand-held; temporarily attached to an adjustable pole; supported from above by way of a harness; suspended by a carriage or member arranged on an elongate flexible member, such as, a cable, wire, filament, rope, etc., supported by respective poles or other structures; temporarily integrated with a land-based vehicle, a floating or buoyant vehicle, an underwater vehicle, a lighter than air vehicle or even integrated on other types of aerial vehicles. Accordingly, an image-capture system consistent with the present principles and techniques is not necessarily stationary and can be in motion.

The present image-capturing techniques can be used to forward a set of diffuse albedo surface textures to a photogrammetry engine to generate a dense surface mesh, which after post-processing delivers a render mesh. The render mesh includes a three-dimensional model of the geometry of the subject matter captured in the images and a set of UV maps. The render mesh is used with camera orientation information and the surface textures to create corresponding diffuse albedo projection maps. The render mesh and the diffuse albedo projection maps are inputs that can be used by an image processor to create a three-dimensional color representation of the subject matter captured in the images.

Alternatively, the present image-capturing techniques and processing methods can be applied in conjunction with structured light, sonar (sound navigation and ranging), LiDAR (a portmanteau of "light" and "radar"), light field camera technology, and other scanning methods to leverage camera projection mapping to produce information models to support the creation of more realistic virtual environments that adapt to changes in point of view, changes in position of a virtual or CG light source and for some environments changes in position of the sun. These other scanners and methods may supplant the role of a photogrammetry engine in solving for camera orientation, performing bundle adjustment, and providing a render mesh in their respective ways.

The present methods can be applied to paired images captured and subsequently processed by a difference blend operation and/or CNNs. The result of the difference blend operation, a modified image or specular roughness surface texture, can be stored and applied as an input to an image processor to generate specular roughness projection maps using the three-dimensional model and UV maps generated from the diffuse albedo surface textures, structured light techniques or alternate scanning methods. The image processor may arrange the diffuse albedo projection maps and specular roughness projection maps in registration with each other using "shaders" or image processing algorithms to further enhance the realistic nature of virtual environments generated with the disclosed photographic and image-processing techniques.

The present methods can be adapted and applied to images captured with conventional digital image sensors, binned sensors, multi-spectral sensors and even hyperspectral sensors, as may be desired.

The present methods can be applied to images captured and represented in a model of an outdoor location, an indoor location where ambient light is controllably disabled, a location with restricted access, or even an underwater or subterranean location. Any of the mentioned locations may be captured in images using the described photographic techniques and processed using the described image-processing techniques to generate a virtual representation of a real-world scene for use as an input to an editing tool. Such an editing tool can be used to modify a scene that may be integrated in a movie, television show or other cinematic production broadcast or distributed on a storage medium. These products may be stored and distributed in digital formats or via other media such as film. In addition, any of the mentioned locations may be used to generate a virtual environment used in an exhibit, as a training aid, or in the development of a video game.

Given the complexity of materials and lighting effects, solving for low to high frequency reflectance properties begs for a hybrid approach integrating the predictive power of CNNs with the empirical scan-based data made possible by the described image capture system. To more fully account for the range of materials in larger scale environments where a broader range of static and/or dynamic lighting conditions and effects are either in play during volumetric capture, or are desired in an end product as made possible by PBR-savvy lighting engines during rendering, a new approach of applying the first and second data sets (the paired images of substantially the same scene) to train a CNN to derive a SVBRDF for one or more materials in a scene captured in the images is described.

Still further, a series of images captured from a fixed location and orientation while a light traverses the field of view such that with each exposure the light source is in a new position along a path provides an additional stream of image information that can be coupled with the paired images for training CNNs, contributing yet more significantly in deriving the SVBRDF when larger scenes featuring a broader range of complex materials are either illuminated with more complex ambient lighting conditions, both static and dynamic, or where fully light-denied environments, require controlled lighting for objects of interest within the scene to be modeled.

To relate datasets between imagery exposed using a repositioned light source as captured from a fixed image sensor with imagery separately captured using the above-described co-polarized and cross-polarized exposures, a most direct correlation implies a shared camera orientation. That is, while a workflow that collects the first and second data sets is characterized by handheld photography, or photographic collection from any free-standing chassis, comparing changes in per pixel values within a sequence of photos of substantially the same scene illuminated with a moving light source separate from the image sensor implies the need for a fixed perspective, such as from a tripod. By placing the previously described image capture system on a tripod it is possible to more effectively train CNNs when co-polarized and cross-polarized exposures of a scene provide nearly identical rasters using the same camera to record reflections from surfaces or objects of interest present in the scene. In a given environment, to ensure anything between believability and comprehensive coverage, a technician would first navigate the space taking an inventory of all materials present. From a first location a given perspective may optimize for taking in as broad a sampling of materials present, these seen from an angle to optimize for recovering reflectance properties. While Li et al. features camera angles perpendicular to largely flat surfaces, such as ceramic tiles or the side of figurines, wider views of more complex scenes may require material acquisition from multiple views of the same set of materials present to provide critical mass in terms of the quality of texture information used to train CNNs, as defined by ideal camera angles relative to surfaces. Materials that are either partially or entirely occluded from view within a space may require repeating a workflow capturing a sequence of images of a light source in motion with a workflow capturing the first and second data sets. Such would be the case with capturing extensive manmade and natural environments. For example, each room of a house or even each building in a complex, by introducing novel content, will require thinking afresh what constitutes ample coverage to reconstruct a believable model with artificial lighting effects. Whereby nature rarely features neat barriers between spaces such as doorways, it nonetheless requires thought how best to organize material acquisition as part of volumetric capture to satisfy for anything between believability and comprehensive in how reflectance behavior of material properties is ultimately displayed.

The methods summarized above can be extended to further include using the first and second data sets, the SVBRDF developed from the first and second data sets, and a sensor orientation to generate a UV map; and receiving information representative of a surface geometry of the subject matter, wherein using the first and second data sets further includes applying color information from the data set over the surface geometry.

The methods summarized above can be extended to include generating a virtual environment from the surface geometry of the subject matter and the UV map; receiving a preferred orientation; and modifying the virtual environment in response to the preferred orientation.

Any of the models of a scene developed from the paired images and a SVBRDF whether developed from the paired images alone or from the paired images in combination with the described third data sets may be used to generate a virtual environment used in a product selected from the group consisting of an exhibit, video game, cinematic production, and a teaching aid.

Still further, any of the above described image processing methods may be further augmented by receiving information characterizing a virtual light source; and modifying the virtual environment in response to the virtual light source and the preferred orientation. A virtual light source may be defined by one or more of a location, a luminous flux, and a frequency range.

The above described image processing methods may also be augmented to include placing at least one light probe in the scene to be imaged in a location such that light reflected by the at least one light probe is used to determine a location of the light source as the light source is moved to illuminate an object with complex surfaces or surfaces difficult to capture with a workflow that collected the first and second data sets.

In an example embodiment, the third data set may include images captured with a stationary image sensor located and oriented to capture images of a substantially planar surface present in the field of view, where the normal of the planar surface substantially faces the image sensor. Each exposure may include subject matter illuminated with a repositioned light source that over the set of exposures traverses a path.

In embodiments of the above described methods, the first data set and the second data set include subject matter illuminated with a controlled illumination source arranged about a perimeter of an image sensor.

In an example embodiment, the third data set representative of images of substantially the same scene further includes images captured with the light source subsequently repositioned between one of the first location or the second location to a third location such that a second line traversed by the light source over the separate exposures is substantially orthogonal to the first line traversed by the light source.

In some embodiments, the third data set representative of images of substantially the same scene can further include images captured with the light source subsequently repositioned between one of the first, second or third locations and a fourth location such that a third line traversed by the light source over the separate exposure at each light source position is substantially orthogonal to both the first line and the second line traversed by the light source.

In still other embodiments, third data set may include images captured with the light source subsequently repositioned between the first location and the second location traverses a path other than a straight line. Such curved translations over the set of exposures may be localized to one of a X-Y plane, a X-Z plane or a Y-Z plane or alternatively a curved path may traverse a space in all three of the X, Y and Z directions however defined.

In the above described methods, the first and second data sets respectively may include a set of exposures captured from more than one perspective of a scene, with the third data set including a set of exposures captured from a single perspective of a scene from a perspective that is substantially shared with at least one member of the first data set and at least one member of the second data set.

A CG or virtual light source can be introduced in a virtual environment of any of the mentioned locations and manipulated by selecting a source position, a luminous flux, and a range of frequencies to associate with the virtual light source. In addition, a point of view of a virtual observer or a virtual camera can be introduced into the virtual environment by identifying the observer's location in the coordinate space and identifying an observation axis with a vector from the observer's location. A source position can be determined by coordinates in a three-dimensional coordinate space or by a vector and a distance from a reference in the modeled volume. The range of frequencies associated with the virtual light source may include visible light, while the projection maps used to color a model may reflect visible, multispectral, and hyperspectral data as recorded into the imagery obtained by the capture system. Additional information may be added to further adjust the CG or virtual light source.

For example, a lamp such as a flashlight, head light, fluorescent or neon tube or even natural light sources may be modeled and represented in the virtual environment by applying information consistent with visually perceived characteristics of the corresponding light source. In the case of flashlights, head lights, and some overhead fixtures, source position, luminous flux and the range of frequencies to adjust the perceived color may be augmented by the introduction of a virtual reflective surface to direct the CG or virtual light in a particular direction. A combination of a reflector and a diffuser may be introduced to represent an overhead light fixture. A combination of a light bulb and a lamp shade may be introduced to represent a light source commonly used in a home. By way of further example, a flame, campfire or other fire may be "virtually" added to a scene through the introduction of appropriate variations in color, intensity and position over time.

As a consequence of the described image-capture techniques and image-processing methods the substantially shadow-free diffuse albedo projection map and the substantially shadow free specular roughness projection map can be applied with a three-dimensional model and UV maps to render a virtual environment that can be manipulated to allow an observer to view a real-world scene not under the conditions in which the images were captured but as such a virtual observer would see the scene with respect to different artificial and even natural light sources with respect to a desired observation location and orientation.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the inventive systems and methods as defined in the claims.

BRIEF DESCRIPTION OF THE DRAWINGS

The systems and methods for processing image information can be better understood with reference to the following drawings. The components in the drawings are not necessarily to scale, emphasis instead being placed upon clearly illustrating the involved principles.

FIG. 4A is a schematic diagram of an embodiment of the image-capture system of FIG. 3.

FIG. 12A and FIG. 12B include schematic diagrams illustrating polarization of light.

DETAILED DESCRIPTION OF ILLUSTRATED EMBODIMENTS

As a consequence of the described image-capture techniques and image-processing methods the substantially shadow-free diffuse albedo projection map and the substantially shadow free specular roughness projection map can be applied with a three-dimensional model to render a virtual environment that can be manipulated to allow an observer to view a real-world scene not under the conditions in which the images were captured but as such a virtual observer would see the scene with respect to different artificial and even natural light sources with respect to a desired observation location and orientation.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the inventive systems and methods as defined in the claims.

Figure 1:
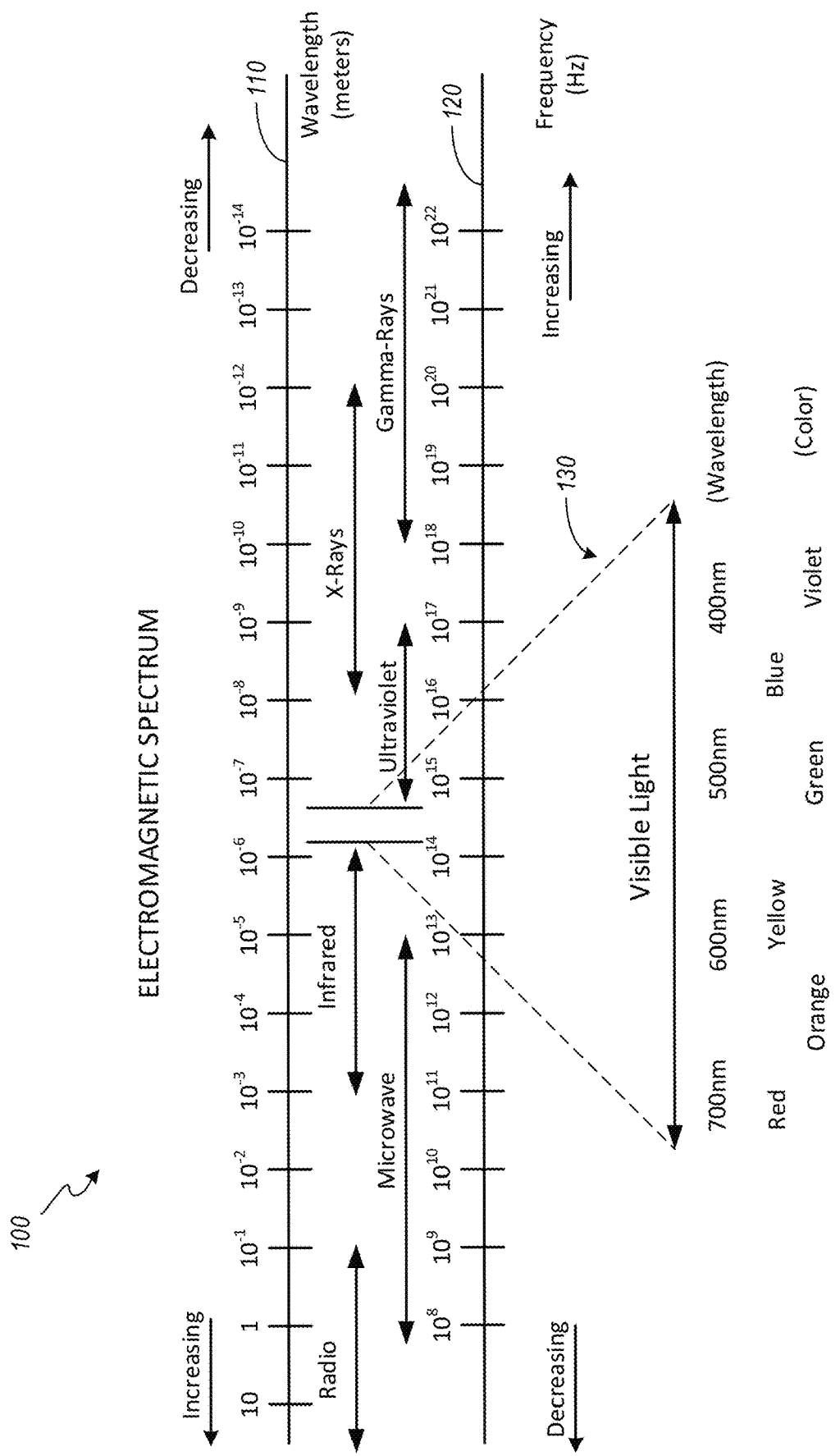
FIG. 1 is a schematic diagram illustrating the electromagnetic spectrum.

FIG. 1 is a schematic diagram illustrating the electromagnetic spectrum. The electromagnetic spectrum 100 includes the range of wavelengths or frequencies over which electromagnetic radiation extends. As illustrated, the electromagnetic spectrum 100 is commonly described by wavelength, a wave name, and/or frequency. Abscissa 110 includes a scale ranging from about 10 meters to about 10-14 meters. The abscissa 110 depicts a decreasing wavelength from left to right across the diagram. Conversely, the abscissa 120 depicts an increasing frequency from left to right across the diagram. The abscissa 120 includes a scale ranging from about 108 to 1022 Hertz (Hz).

Moving from left to right across the electromagnetic spectrum 100 waves names include radio, microwave, infrared, ultraviolet, X-rays and Gamma-rays. As indicated, by a corresponding horizontal two-headed arrow, each of the wave names corresponds to a range of the electromagnetic spectrum 100 that corresponds to a range of wavelengths and a range of frequencies. As also shown in FIG. 1 not all wave names correspond to a distinct and separate portion of the electromagnetic spectrum 100. For example, microwaves overlap both radio waves and infrared waves. By way of further example, X-ray waves or simply X-rays overlap both ultraviolet waves and Gamma-ray waves or simply Gamma-rays.

Between the infrared and ultraviolet waves lies a range of the electromagnetic spectrum that includes visible light 130. As illustrated, visible light 130 for a typical human observer ranges from about a wavelength of 780 nanometers (nm), which corresponds to the color red to a wavelength of about 390 nm, which corresponds to the color violet. These wavelengths correspond to a frequency band or frequency range in the vicinity of about 430 THz (1012 Hz) to 770 THz. Some human eye-brain systems may respond to electromagnetic waves below 390 nm, while some other human eye-brain systems may not respond at all at those wavelengths. Similarly, some human eye-brain systems may respond to electromagnetic waves above 780 nm, while some other human eye-brain systems may not respond at those wavelengths.

Technically, light does not have a color. Light is simply an electromagnetic wave with a specific wavelength or a mixture of wavelengths. An object that is emitting or reflecting light appears to a human to have a specific color as the result of the eye-brain response to the wavelength or to a mixture of wavelengths. For example, electromagnetic waves with a wavelength of between about 580 to 595 nm appear yellow to most humans. In addition, a mixture of light that appears green and light that appears red appears to be yellow to most humans. When electromagnetic waves having a broad range of wavelengths between about 390 nm to 780 nm enter a human eye, most humans perceive "white" light.

Non-visible or invisible light corresponds to those portions of the electromagnetic spectrum 100 outside of the range of visible light 130. More specifically, a first non-visible range includes electromagnetic radiation with wavelengths longer than about 700 nm or frequencies of less than about 430 THz. This first non-visible range includes, for example, infrared, microwave and radio waves. A second non-visible range includes electromagnetic radiation with wavelengths shorter than about 390 nm or frequencies greater than about 770 THz. This second non-visible range includes, for example, ultraviolet, X-rays and Gamma-rays.

As illustrated schematically in FIG. 12A and in FIG. 12B, a polarizer or polarizing filter 1210, 1215 substantially reduces the passage of electromagnetic radiation or light 1200 in other than a desired plane. Light 1200 is shown as a pair of two-headed arrows 1202, 1204 that represent respective traveling waves that oscillate about their intersection at point 1205. In the illustrated arrangement, light 1200 (or the traveling wave) is traveling into or out from the page at the intersection 1205 of arrow 1202 and arrow 1204. Schematically, the "+" sign represents an arrangement of the polarizing filter 1210 in registration with the intersection 1205 of the two-headed arrows 1202, 1204. That is, the polarizing filter 1210 may be placed in front of a light beam 1200 or ray traveling in a direction out of the page or towards an observer. When so arranged, the polarizing filter 1210 prevents the passage of light 1200 oscillating in any other orientation than vertical (up and down the page) beyond the polarizing filter 1210. Stated another way, polarizing filter 1210 allows polarized light 1220, which is oscillating vertically or along a plane identified schematically as being parallel with a line defined by 90° and 270° labels along a unit circle 1222.

Similarly, in FIG. 12B, light 1200 is polarized by placing a polarizing filter 1215 that is arranged to allow passage of light 1200 oscillating horizontally in registration with the light 1200. That is, the polarizing filter 1215 may be placed in front of a light beam 1200 or ray traveling in a direction out of the page or towards an observer. When so arranged, the polarizing filter 1215 prevents the passage of light 1200 oscillating in any other orientation than horizontal (left and right across the page) beyond the polarizing filter 1215. Stated another way, polarizing filter 1215 allows polarized light 1225, which is oscillating horizontally or along a plane identified schematically as being parallel with a line defined by the 0° and 180° labels along a unit circle 1227. When deployed as depicted in FIG. 12A and FIG. 12B, the polarizing filter 1210 allows polarized light 1220 oscillating in a first orientation or plane to pass and polarizing filter 1215 allows polarized light oscillating in a second orientation or plane orthogonal with respect to the first orientation to pass.

Figure 2:
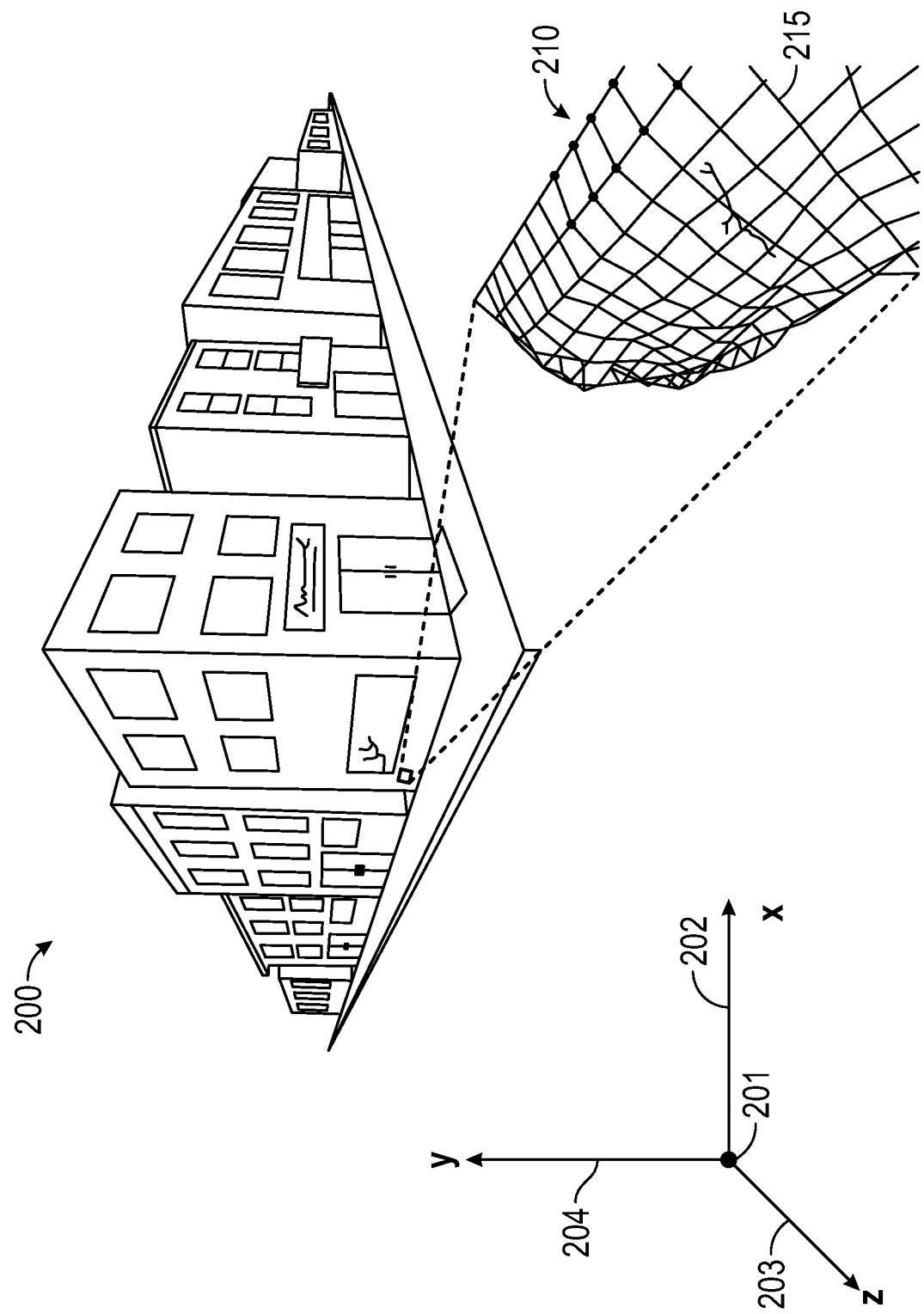
FIG. 2 is a schematic diagram illustrating an exemplary real-world scene to be recorded with an image-capture system using novel image-capture techniques.

FIG. 2 is a schematic diagram illustrating an exemplary real-world scene 200 to be recorded with an image-capture system using novel image-capture techniques. The example real-world scene 200 is a junction of two streets in a city bordered by man-made structures such as two-story and three-story buildings. The various structures and features of the real-world scene 200 can be defined in a three-dimensional coordinate system or three-dimensional space having an origin 201, an abscissa or X-axis 202, an ordinate or Y-axis 204, and a Z-axis 203.

In the illustrated embodiment, the three-dimensional coordinate system is a right-handed coordinate system. In a right-handed coordinate system, the positive x and y axes point rightward and upward across the two-dimensional page and the negative z axis points forward or into the depicted scene. Positive rotation is counterclockwise about the axis of rotation.

It should be understood that alternative coordinate systems, such as a left-handed coordinate system or a spherical coordinate system (both not shown) may be used to develop a three-dimensional model of features in a real-world scene 200. While the origin 201 is not overlaid or associated with a physical feature in the illustrated real-world scene 200, such an association is convenient and may be preferred. For example, if a surveyor's pin or other boundary marker is available, the surveyor's pin or marker may be adopted as the origin 201 for the three-dimensional volume to be modeled.

Whatever coordinate system is used and whatever feature or features may be used to define an origin, the process of developing the model of a real-world scene or location may benefit from a preliminary mapping of a space to plan an effective strategy for positioning and collecting images. Such a preliminary mapping may create a route or course that traverses the three-dimensional volume. The route or course may include a flight plan to guide one or more aerial platforms to position an image-capture system as images are being exposed and stored. Such a preliminary investigation and plan may be used to define and extend the bounds of a known space into an unknown space, such as with a manned or unmanned original exploration of underwater features like a shipwreck or subterranean features such as a cave.

As further illustrated by way of a relatively small insert near a lower leftmost corner of a building that faces both streets, a material used on the front of the building (e.g., concrete, granite, brick, etc.), which may include large enough surface variation to be measured by a photogrammetry engine, is represented by a localized three-dimensional polygonal mesh 215. The polygonal mesh 215 is an arrangement of adjacent polygons, the vertices of which are defined by a point cloud 210. In the illustrated embodiment, the point cloud 210 is represented by black dots at vertices of some of the various polygons. Each of the vertices or points in the point cloud 210 is identified by coordinates in a three-dimensional coordinate space or by a vector and a distance from a reference, such as, origin 201, in a modeled volume. Since every point is identified by coordinates in the three-dimensional coordinate space, each polygon or closed area in the polygonal mesh 215 can be identified by its vertices or by a normal vector derived from the plane of the surface defined by the vertices.

In the illustrated embodiment, a surface construction or reconstruction process has been performed. Such a surface reconstruction uses the locations defined by the points of the point cloud 210 to define a four-sided polygon or quadrilateral. Alternative surface reconstruction algorithms may use three points from the point cloud or other collections of points greater in number to represent surfaces of features in a real-world scene 200. However, surfaces represented by triangles and quadrilaterals are generally preferred. The closed areas of sub-portions of a polygonal mesh 215 are often associated with a two-dimensional unfolded version of the corresponding surface geometry. These two-dimensional representations are commonly called UV maps. The letters "U" and "V" denote axes of a two-dimensional texture. When matched or projected with appropriate color and relatively finer texture information in proper registration with the surface geometry over the entirety of the surfaces in the polygonal mesh 215 a three-dimensional color model of the real-world scene 200 is created.

From the above it should be understood that both photographic and photogrammetry techniques are used to generate a model of the relatively large-scale geometry that photogrammetry techniques can measure. That model is then used as a framework for locating and folding the color and relatively finer variations in surface textures as captured in two-dimensional photographs to generate a more realistic three-dimensional model of a real-world scene or location. This first improved three-dimensional color model is constructed solely from diffuse albedo surface textures.

The same relatively large-scale geometry is used to locate and unfold a modified two-dimensional image generated from an algorithmic combination of color information from related photographs of nearly the same subject matter that includes a specular roughness surface texture isolated from the diffuse albedo surface texture. The addition of the specular roughness surface texture as a separate digital asset further improves the realistic response to CG or virtual light in a virtual environment rendered from the three-dimensional color model.

Figure 3:
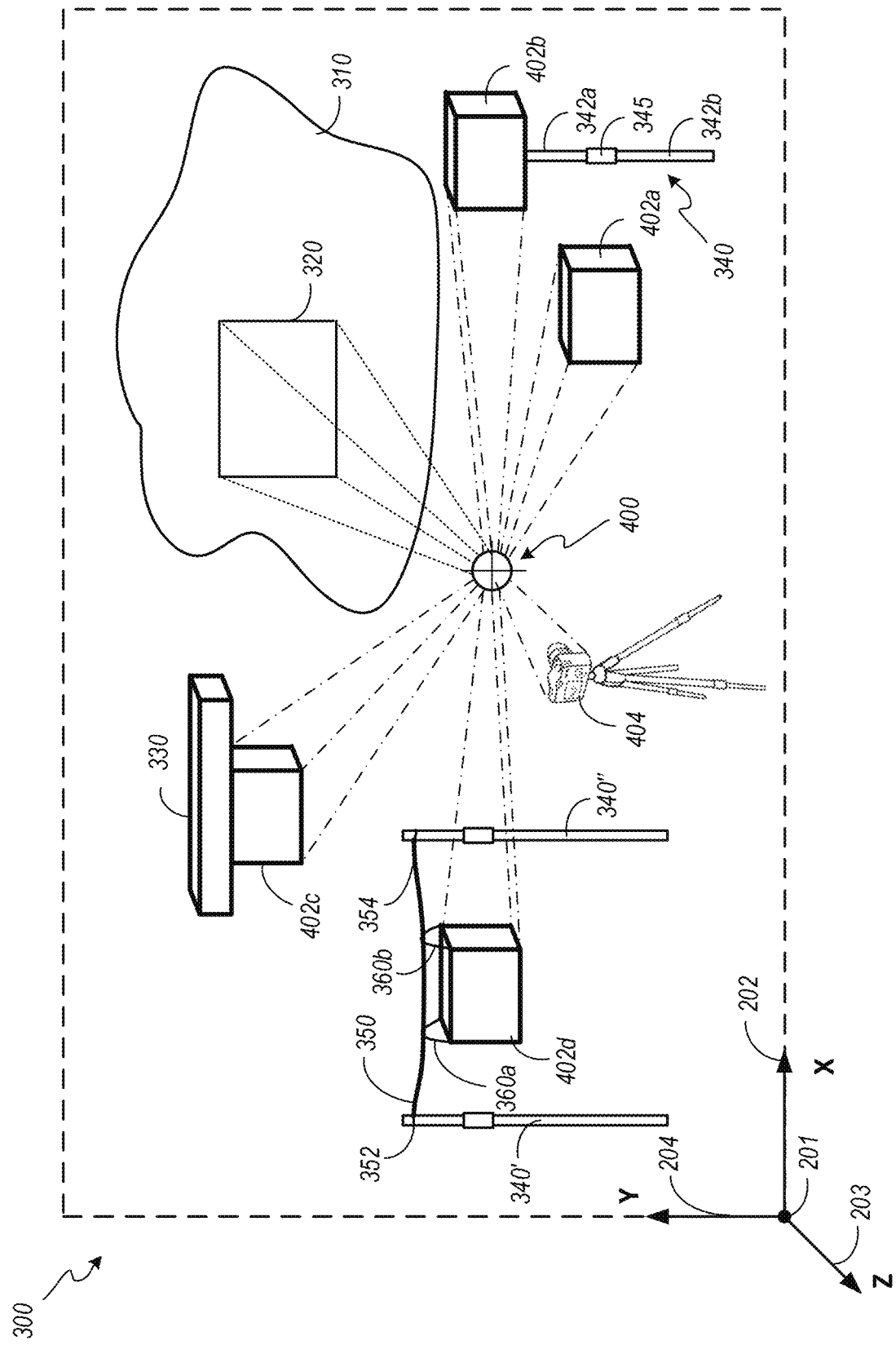
FIG. 3 is a schematic diagram illustrating an image-capture system within a real-world scene including a surface-of-interest.

FIG. 3 is a schematic diagram illustrating an image-capture system 400 within a portion of a real-world scene 300 including a surface-of-interest 310. In the illustrated example, the image-capture system 400 uses an alternative scanner to project an image frustum 320 on the surface-of-interest 310. The image frustum 320 provides distance, orientation, and location information that can be used by an operator or photographic processing systems in the image-capture system 400 to identify the location in the real-world scene 300 where images are to be captured. Although the subject matter captured in an image is described above as including a surface-of-interest 310 it should be understood that the image-capture system 400 is capable of recording images that include a desired portion of a real-world scene 300 that may include multiple surfaces of one or more objects present in a field of view when the image is exposed and temporarily stored in the image-capture system 400.

The image-capture system 400 is arranged in a freestanding chassis 402. In a first embodiment the freestanding chassis 402a is moved throughout the real-world scene 300 by an operator. In this first embodiment, the freestanding chassis 402a is representative of a handheld mode of operation where camera translation and rotation are determined for each exposure. Although the image-capture system 400 is described above as being arranged within a freestanding chassis 402a it should be understood that the image-capture system 400 in some embodiments may be arranged with elements and control interfaces that may extend to or beyond the chassis. For example, one or more of a battery, an illumination source, a lens assembly, etc. may extend from or be coupled to the freestanding chassis 402. When a separate battery pack is desired, one or more elements or subsystems of or the entire image-capture system 400 may be connected by way of a cable or set of wires to one or more batteries (not shown).

In an alternative embodiment, the freestanding chassis 402b is coupled to an adjustable extension pole 340. A two-section pole is illustrated. However, a pole with additional sections or poles that connect to each other can be used. The extension pole 340 includes a section 342a, a portion of which can be stored within a volume enclosed within section 342b and a portion of which can be extended from section 342b. An adjustment sleeve 345 uses friction forces along the longitudinal axis of the section 342b and section 342a to temporarily set the distance between an opposed or support end of the section 342b and the connection end of section 342a connected to or placed against a receiver portion along a surface of the freestanding chassis 402b of the image-capture system 400. The adjustment sleeve 345 can be manipulated (e.g., rotated) to reduce the radial forces being applied against the external surfaces of sections 342a, 342b when an operator desires to adjust the length of the extension pole 340.

In operation, with a desired length temporarily set or fixed by the adjustment sleeve 345, the opposed or support end of the extension pole 340 can be placed on the ground or another surface capable of supporting the weight of the combination of the extension pole 340 and the image-capture system 400 within the freestanding chassis 402b. The pole 340 can be held by an operator to prevent rotation. Alternatively, the pole 340 can be supported by a set of three or more guy wires (not shown).

In an alternative embodiment, the freestanding chassis 402c is coupled to a vehicle 330. A drone is depicted schematically in an airborne mode of operation. A drone is one example of an airborne vehicle. Other airborne vehicles could be used to support the freestanding chassis 402, as may be desired. In other embodiments, the vehicle 330 can be a land-based vehicle, a boat or other buoyant vehicle that operates on or near the surface of a body of water, a submarine that operates near or below a surface of a body of water, etc. One or more such vehicles can be operated to assist in the relative positioning of the image-capture system 400 with respect to a surface-of-interest 310 to be photographed.

In another alternative embodiment, the freestanding chassis 402d is arranged with carriage supports 360 that hang below an elongate flexible member 350 between pole 340' and pole 340". In the illustrated arrangement, carriage support 360a is connected near the upper leftward facing side of the freestanding chassis 402d and carriage support 360b is connected near the upper rightward facing side of the freestanding chassis 402d. The elongate flexible member 350 passes through a respective opening in the carriage supports 360. The elongate flexible member 350 can be a wire, filament, rope, cable or cord that is temporarily connected at one or both of a first end 352 at pole 340' and at a second end 354 at pole 340". The respective lengths of the pole 340' and the pole 340" can be adjusted to account for uneven terrain.

When so arranged, the freestanding chassis 402d may be maneuvered laterally with respect to a surface-of-interest 310 in a real-world scene 300. Such maneuvering can be accomplished by applying an external force to the freestanding chassis 402d with a hand, another pole, and or by attaching a string, rope, wire or cable to one of the carriage supports 360 or to the freestanding chassis 402d and pulling the same to adjust the relative position of the freestanding chassis 402d between the poles 340.

Whether the image-capture system 400 is handheld, connected to a pole or poles, suspended from a lighter than air vehicle, suspended from a cable supported between poles, suspended by wires or ropes from a man-made or natural surface, or connected to a vehicle, an image sensor in the image-capture system 400 may not be stationary and in some modes of operation is necessarily non-stationary.

When the image-capture system 400 is handheld, an operator can adjust any function using interfaces and mechanisms for making such adjustments. When the image-capture system 400 is connected to a pole 340, suspended from a lighter than air vehicle, suspended via wires or ropes from a man-made or natural surface, or connected to a floating or land-based vehicle, a wired or wireless interface may be used by an operator to enter adjustments as may be desired as the image-capture system 400 is maneuvered about the real-world scene 300.

In another alternative embodiment, an image capture system with an image sensor and supported by a stationary chassis 404 can be arranged to capture image information responsive to reflected light incident upon a surface of interest 310. As will be described in association with FIG. 13, a light source separate from the image capture system and the stationary chassis 404 may be used to illuminate the surface-of-interest 310 while one or more images are captured by the image capture system along a substantially similar orientation as that used to captured cross-polarized and co-polarized images.

FIG. 4A is a schematic diagram of an embodiment of the image-capture device 400 of FIG. 3. As illustrated, the image-capture device 400 is an assembly of subsystems including an illumination source 410, illumination controller 420, an optional scanner subsystem 425, optical subsystem 430, shutter 440, processor 450 and memory 460. The processor 450 is arranged to manage and coordinate the operation of the various mechanical and electro-mechanical subsystems in the image-capture device 400 and any peripheral systems, such as a battery or batteries, which energize the various components. The processor 450 can be enabled by a "system-on-chip" or SoC which includes a set of interconnected electronic circuits typically, but not exclusively, including a hardware core, a memory, and a communication interface. A hardware core may include a variety of different types of processors, such as a general-purpose processor, a central processing unit (CPU), a digital signal processor (DSP), an auxiliary processor, a graphical processing unit, among other circuits. A hardware core may further embody other hardware and hardware combinations, such as a field programmable gate array (FPGA), an application-specific integrated circuit (ASIC), other programmable logic device, discrete gate logic, transistor logic, performance monitoring hardware, etc.

The processor 450 may operate autonomously, in response to one or more inputs received from an operator and or in conjunction with information received from scanner subsystem 425. The scanner subsystem 425 may include a remote sensing technology such as LiDAR which measures distance by illuminating a target with a laser and analyzing the reflected light. Such distance information can be applied by the processor 450 to set one or more operational parameters such as a focus adjustment, aperture, image sensor sensitivity, shutter speed. In addition, such distance information can be useful in guiding the position of the image-capture device 400 as it traverses the real-world scene 300.

Furthermore, the scanner subsystem 425 may be adapted to provide a point cloud 215 and/or a polygonal mesh from the distance information which can be stored in one or more data files in telemetry store 465. Alternatively, or in addition to LiDAR, the scanner subsystem 425 may include a system that projects a known pattern onto a subject or surface of interest and uses a mathematical reconstruction of any deformation in the reflected pattern. When a subject having a surface-of-interest is observed from multiple angles, the various reconstructions can be used to identify common features to stitch scanned portions of a scene together or to maneuver the image-capture device 400 along a predetermined course or path through a previously scanned location of interest.

However embodied, the processor 450 is arranged to generate and communicate a control signal or set of control signals at appropriate times to the illumination controller 420. In turn, the illumination controller 420 enables the emitter 416 which generates and emits controlled light in a direction substantially orthogonal to an external or mounting face of the image capture device 400. Controlled light is polarized in one or more desired polarization angles.

In the embodiment illustrated in FIG. 4A, the emitter 416 is a composite element that includes a first emitter 412, which generates and directs non-polarized light through a polarizer 415a and further includes a second emitter 414, which generates and directs non-polarized light through a polarizer 415b. The polarizer 415a and the polarizer 415b and at least a portion of the first emitter 412 and the second emitter 414 are separated by an opaque barrier (not illustrated) that prevents light from the first emitter 412 from passing through the polarizer 415b and similarly prevents light from the second emitter 414 from passing through the polarizer 415a. Polarized light 413, or light that passes beyond the polarizer 415a that is oscillating in a first orientation, is directed away from the image-capture device 400 toward a surface-of-interest 310 in a real-world scene 300. Similarly, polarized light 417 that passes beyond the polarizer 415b that is oscillating in a second orientation is directed away from the image-capture device 400 toward a surface-of-interest 310 in a real-world scene 300. The polarizer 415a and the polarizer 415b are arranged so that the polarized light 413 and the polarized light 417 are substantially orthogonal with respect to the other. The polarized light 413 and the polarized light 417 are reflected by the subject-of-interest 310. In addition, an opaque barrier (not shown) prevents the polarized light 413 and the polarized light 417 from entering the optical subsystem 430 without reflecting from a surface or object of interest. As indicated schematically in FIG. 4A, reflected light 419 from the surface-of-interest 310 and responsive to the incident polarized light 413 and incident polarized light 417 is received by the optical subsystem 430.

The optical subsystem 430 includes a polarizer 432, lens housing 433 and aperture 434. The aperture 434 is a diaphragm that controls the size of an opening that permits the reflected and polarized light to pass through the shutter 440 on its way to the image sensor 445. A lens (not shown) within the lens housing 433 focuses the reflected light 419 at the image sensor 445. The polarizer 432 reduces the amount of light incident upon the lens housing 433 by permitting light having a specific polarization state or oscillating orientation to pass through and substantially reducing reflected light 419 present at a surface of the polarizer 432 having polarization states other than the specific polarization state. When the polarizer 432 is arranged to allow light oscillating in an orientation that is within a few degrees of an orientation defined by one of the polarizer 415a or the polarizer 415b (when the polarizer 415a has an orientation that is approximately orthogonal or shifted 90° to the orientation of the polarizer 415b) and when both the emitter 412 and the emitter 414 are energized together, and the shutter 440 is opened, the sensor 445 is exposed to co-polarized light 441 and cross-polarized light 442. Alternatively, when the illumination controller 420 directs the illumination source to energize one of the emitter 412 or the emitter 414, and when the shutter 440 is opened, the sensor 445 is exposed to either co-polarized light 441 alone or cross-polarized light alone 442.

When the image sensor 445 is sensitive to visible light, the image sensor 445 generates electrical signals corresponding to the amount of electromagnetic radiation in each of the red, green, and blue frequency ranges. The electrical signals are composited and stored in a uniform manner in memory 460 as an image 462a. The shutter 440 and aperture 434 are opened and closed as directed by control signals generated in and communicated from the processor 450. These control signals are coordinated with the signal or signals communicated to the illumination controller 420 to ensure that the subject-of-interest 310 is sufficiently illuminated and a suitable image is captured and stored in the memory 460. In close proximity to this first exposure and capture of the image 462a, the processor 450 generates a signal or signals that direct the illumination controller 420 to enable the other of the emitter 412 or the emitter 414.

The polarizers 415a, 415b may be linear polarizers embodied in a film. Alternatively, polarization may be controlled in specially constructed light emitting diodes. Alternatively, one or both polarizers 415a, 415b can be embodied with a set of laminated plates. The plates include glass substrates with electrodes, and a nematic liquid crystal layer between the electrode layers. Appropriately energizing the electrode layers at a desired time instantly switches the state of the polarizing angle from a first orientation angle of 0° to a second orientation angle of 90°.

When a single electronically enabled polarizer 415 is included in the image-capture device 400, the emitter 412 and the emitter 414 may be coupled to optimize total light output. In such an arrangement, the illumination power may be controlled by adjusting a bias current that is coupled to the individual light emitting elements (e.g., light-emitting diodes) forming a composite emitter 416. When the polarizer 415 is enabled the bias current is controllably adjusted between exposures to compensate for the varying light loss associated with co- and cross-polarized exposures.

As described, when a polarizer is configured to transmit light waves running in parallel to those allowed to pass through a second polarizer covering a lens, the first polarizer placed between an illumination source and a subject-of-interest, a relatively lower illumination power may be required to illuminate the subject-of-interest during one of the paired or related image exposures. When a polarizer 415 is either permanently introduced in the case of a film or temporarily enabled when an electronically controlled polarizer is placed between an illumination source 410 and a subject-of-interest, a relatively larger illumination power is provided to illuminate the subject-of-interest (e.g., a surface or surfaces) during the remaining one of the paired image exposures. The elapsed time between a first exposure and a subsequent exposure is controlled by the processor 450 by synchronizing the aperture 434, shutter 440 and the illumination controller 420.

Accordingly, polarized light 413 in a first orientation or polarized light 417 in a second orientation is directed away from the image-capture device 400 toward a subject-of-interest 310 in a real-world scene 300. Reflected light 419 from the subject-of-interest 310 is received by the optical subsystem 430. The optical subsystem 430 and shutter 440 are controllably enabled in a coordinated manner with the control signal or signals communicated to the illumination controller 420 to open the aperture 434 and shutter 440 to capture image 462b.

When a polarizing filter is located between the subject-of-interest and an image sensor, the angle of polarization relative to a given light source and reflected off subject matter with a given reflectance property, may reduce the amount of light passed through to the image sensor anywhere between 1.5 f-stops for co-polarized exposures to upwards of 4 f-stops for cross-polarized exposures. Auto-exposure cameras will adjust for the loss of available light by widening the aperture, lengthening the time the shutter is open, and/or increasing the sensitivity of the image sensor. However, metering and auto-focus sensors in certain cameras, including virtually all auto-focus SLRs, will not work properly with linear polarizers because the beamsplitters used to split off the light for focusing and metering are polarization dependent. In addition, linearly-polarized light may also defeat the action of the anti-aliasing filter (i.e., a low-pass filter) on the imaging sensor. Accordingly, auto-focus SLRs will often use a circular polarizer. A circular polarizer consists of a linear polarizer on the front, with a quarter-wave plate on the back. The quarter-wave plate converts the selected polarization to circularly polarized light inside the image-capture system. These circular polarizers work with all types of cameras, because mirrors and beamsplitters split circularly polarized light the same way they split non-polarized light.

A linear polarizing filter can be easily distinguished from a circular polarizing filter. In linear polarizing filters, the polarizing effect works regardless of which side of the filter the scene is viewed from. In contrast, with "circular" polarizing filters, the polarizing effect works when the scene is viewed from one side of the filter, but does not work when looking through the opposed side of the filter. It is noted that linear polarizers deliver a truer specular reflectance model than do circular polarizers.

The principles involved with capturing two images in quick succession with different states of polarization defined by the relative rotation of separate polarizing filters with a first polarizing filter 415a, 415b proximal to the illumination source and a second polarizing filter 432 between the subject of interest and an image sensor 445 and with different illumination power levels can be applied to any light source/fixture and many photographic system architectures. Independent of the type of light source deployed in an emitter 416, the image-capture device 400 optimizes light output where light is needed to reduce or eliminate shadows and to provide sufficient reflected light 419 across the entire two-dimensional array of photosensitive electronic elements in the image sensor 445. For example, light rays cast substantially proximal to and on-axis with respect to the longitudinal axis 447 of the optical subsystem 430, limited only by the ability to place light generating fixtures as close to the outer edge of a lens assembly 433 as imposed by the physical tolerances of manufacturing, can be used to reduce and in some situations all but eliminate shadows. To achieve nearly uniform illumination across the surface-of-interest the light directed away from the image-capture device 400 by the emitter 412, the emitter 414, or a combination emitter 416 and/or the individual elements comprising the described emitters may be collimated. In addition to collimating the light, the individual elements comprising the emitters 412, 414, 416 may be selected for their ability to produce a uniform output over a desired range of frequencies in response to a desired input.

In terms of the volume of light output by the emitter 412 and the emitter 414, light output is paramount to compensate for light loss due to the polarizer(s) 415, 432 as photogrammetry is dependent on low-noise, adequately exposed and focused surface textures. Each of these objectives are compromised by conventional solutions with 1) slower shutter speeds, which introduce the problem of inadequate temporal resolution, 2) wider apertures, which predict shallower depth of field, which in effect compromises the need for in-focus pixels, and 3) higher imager sensitivity, which causes "noise" or larger grain in the images, which both frustrates the photogrammetry engine's abilities to identify common points of interest between overlapping photos, as well as compromises the quality of the texture maps used to skin the geometry returned from the photogrammetry.

Accordingly, in support of optimizing light output, attention may be directed to minimizing the space between light emitting elements in the emitter 412, the emitter 414 or the composite emitter 416 and the outer surface of the lens assembly 433, thereby fitting a greater number of light-emitting elements into that space.

Light that is directed from the image-capture device 400 toward a subject or surface to be captured in an image or exposure (both cross-polarized light 413 and co-polarized light 417) preferably includes a range of visible wavelengths. The illustrated embodiment shows co-polarized or polarized light 417 being emitted or directed away from the image-capture device 400 relatively further away from the optical subsystem 430 than the non-polarized light 413 that emanates from the image-capture device 400. However, the image-capture system 400 is not so limited. In some embodiments, both the emitter 412 and the emitter 414 include respective sets of light-emitting diodes or flashtubes that are arranged about the perimeter of the optical subsystem 430. In these embodiments, the individual elements forming the separately controlled emitters 412, 414 may be alternated element by element, row by row, or arranged in other periodic arrangements about the optical subsystem 430 and more specifically the outer surface of a lens housing (not shown).

In addition to being separately energized by the illumination controller 420, the individual elements of the emitter 412 and the emitter 414 may also be separately energized to finely adjust the luminous flux that is projected from the image-capture device 400 to illuminate the subject-of-interest.

As further indicated in FIG. 4A, the image sensor 445 may comprise an array of elements sensitive to visible light, non-visible light (one or both of ultraviolet and infrared light), multi-spectral light and or hyper-spectral light. Although conventional image sensors may include elements sensitive to one or the other of visible light and non-visible light, the described imaging techniques can be used with image sensors that may combine various ranges of electromagnetic radiation sensitivity. For example, these imaging techniques can be applied to an image sensor that combines infrared sensitive elements with visible light sensitive elements. In other example embodiments, the image sensor 445 may be responsive to multi-spectral light outside of the range of visible light. When the image sensor 445 is sensitive to a combination of various ranges of electromagnetic radiation, the separate elements forming the emitter 412, the emitter 414, or a composite emitter 416 may be arranged with elements capable of producing one or more of non-visible light, multi-spectral light and or hyper-spectral light.

However arranged with respect to the range or ranges of sensitivity to electromagnetic radiation, the image sensor 445 of the image-capture device 400 will benefit from one or more stabilization systems. For example, the Sony Corporation has developed a full-frame camera with 5-axis image stabilization. When energized, the stabilization system uses suitably positioned magnets and actuators to controllably float the image sensor within the camera body. When a subject-of-interest is in focus and the lens assembly communicates the focal length to the stabilization system controller, pitch (rotation about the x-axis), yaw (rotation about the Y-axis, relative shift along the X-axis or Y-axis and rotation about the longitudinal axis of the lens assembly in the X-Y plane can be countered to produce an exposure with substantially reduced image blur even in low-light conditions, while at the same time protecting against a change in camera orientation between exposures of image pairs, thus ensuring nearly identical rasters as required for isolating specular roughness data using the difference blend between each layered image pair and/or via use of CNNs. Such image sensor stabilization techniques provide greater latitude to an operator when selecting an aperture setting.

The first image 462a and the second image 462b can be temporarily stored in the image-capture device 400 such as in memory 460. Other images captured by the image-capture device 400 when supported by a stationary chassis 404 where the surface or surfaces of interest are illuminated with a separate light source that is intermittently repositioned as exposures are captured such that the light source traverses the environment may also be stored in the memory 460. An example of such a separate light source is explained further in the description of FIG. 13. However captured, stored images may be available for later transfer to an image-processing system. Such a transfer need not be direct as image files can be stored on a data-storage medium, on network-coupled storage devices, or on both for later transfer to an image-processing system. In addition, such image information transfers can occur in alternative sequences and even substantially together or overlapping in time. Furthermore, corresponding portions of each of the images may be processed before the entirety of a raster 463 or array of pixels comprising an entire image is received by the image-processing system. Corresponding portions of each of the images are defined both by relative location in an array of pixels and the corresponding data values associated with the sensor at those pixel element locations. For example, if the image sensor is a sensor that is responsive to portions of the electromagnetic spectrum perceived by the average human to correspond to the color red, green and blue, a red data value from a first pixel location defined by a row and a column position with respect to an origin of the raster of pixel elements in the image sensor is mathematically combined (e.g., through subtraction) with a corresponding data value from the same relative pixel location from the remaining image. Similarly, a green data value and a blue data value from the first pixel location, respectively, are mathematically combined with corresponding data values from the same relative pixel location from the remaining image.

When a binned image sensor is used to capture the image information, two or more adjacent pixels of a similar sensitivity range are sampled together to produce a data value. For example, an integer number of "red" wavelength photosensitive elements are sampled together to produce a single data value representative of these wavelengths present in an area of the image sensor. This same sampling technique can be applied to "green" wavelength photosensitive elements, "blue" wavelength photosensitive elements as well as other frequency ranges of the electromagnetic spectrum and the opacity channel as may be desired.

Image data can be arranged in any order using any desired number of bits to represent data values corresponding to the electrical signal produced at a corresponding location in the image sensor at a defined location in the raster of pixels. In computer graphics, pixels encoding the RGBA color space information, where the channel defined by the letter A corresponds to opacity, are stored in computer memory or in files on disk, in well-defined formats. In a common format the intensity of each channel sampled by the image sensor is defined by 8 bits, and are arranged in memory in such a manner that a single 32-bit unsigned integer has the alpha or "A" sample in the highest 8 bits, followed by the red sample, green sample and the blue sample in the lowest 8 bits. This is often called "ARGB." Other standards including different numbers of bits in other sequences are known and used in storing RGB and A channel information. Still other data storage arrangements will be used in conjunction with reflected light captured by a multi-spectral image sensor and a hyper-spectral image sensor.

As further indicated in FIG. 4A, a telemetry store 465 may include device info including image capture device parameters, as well as device orientation and location information in a three-dimensional volume. The telemetry store 465 will include such data for each instance of an image 462a through 462n. Information in the telemetry store 465 will be transferred with the images 462 to an image processing system (not shown).

Figure 4B:
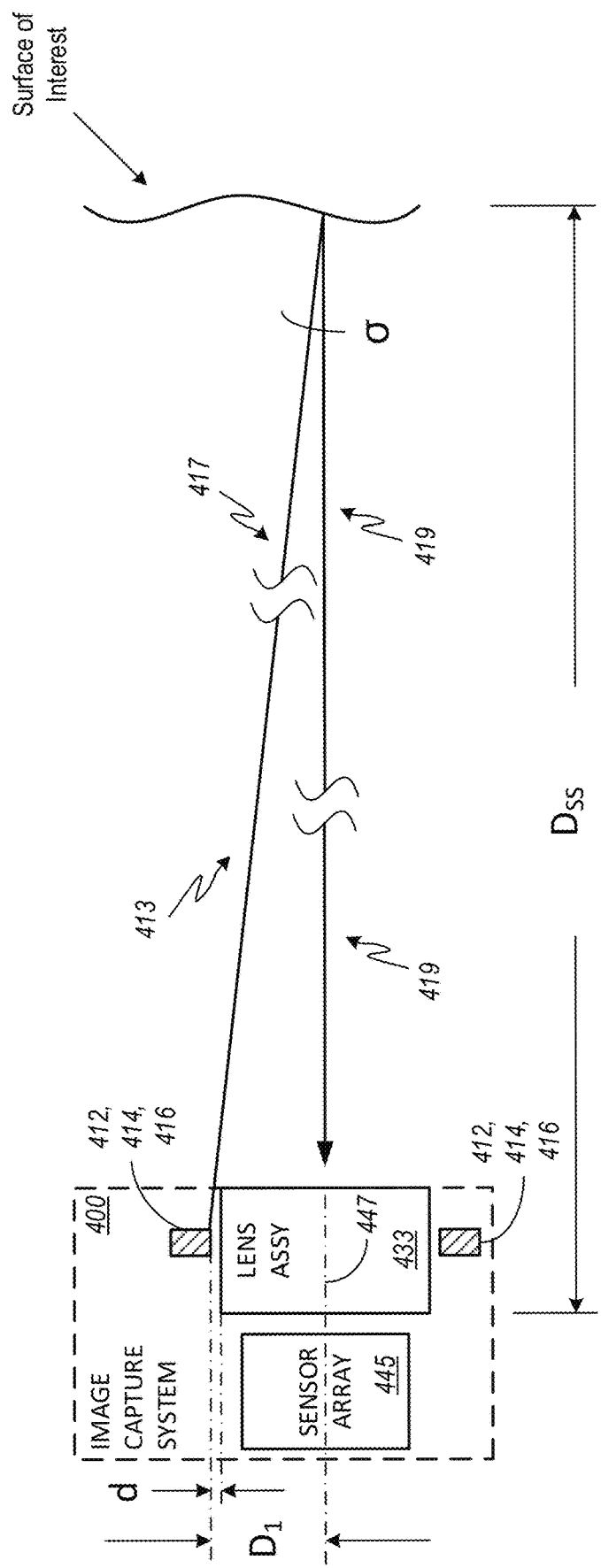
FIG. 4B is a schematic diagram illustrating how an embodiment of the image capture system of FIG. 4A reduces the likelihood of shadows in images.

The schematic diagram in FIG. 4B includes an arrangement of the image-capture device 400 including a composite emitter 416 that surrounds the lens assembly 433 such that the likelihood of shadows is substantially reduced, or for some surfaces and separation distances between the image-capture device 400 and the subject-of-interest, shadows are entirely avoided. As shown, the image sensor 445 and lens assembly 433 are arranged about a longitudinal axis or centerline 447. The longitudinal axis 447 extends in the direction of a normal vector from the photosensitive elements in the image sensor 445 and through the center of lens assembly 433. In the illustrated arrangement, the emitter 416 is shown in a partial section (as if the separately controlled emitter 412 and emitter 414 were cut along a plane that passes through centerline or longitudinal 447). When the lens assembly 433 is shaped like a cylinder, the set of light-emitting diodes or flashtubes forming the emitter 412 and/or the emitter 414 can be arranged in an arc, semicircle or an annular ring so that the light emitting elements can be arranged adjacent to or nearly against the outer surface of the lens assembly 433.

Although the polarizer 415a and the polarizer 415b are adjacent to the emitter 412 and the emitter 414 in the illustrated arrangement to ensure a first orientation of emitted light and a second orientation of emitted light are substantially orthogonal to one another, the image capture device 400 is not necessarily so limited. For example, in an alternative embodiment (not shown) the separate light emitting elements that form the emitter 412 and the emitter 414 are arranged with a collimating dome, lens or other structure arranged to emit light in a desired polarization or orientation. A first orientation or plane corresponding to the emitter 412 is orthogonal to a second orientation or plane corresponding to the emitter 414. As shown in the embodiments illustrated in FIG. 4A and FIG. 4B, a circular polarizer 432 may be arranged in or on the lens housing 433 to capture corresponding images of the same subject-of-interest with co-polarized reflected light and cross-polarized reflected light.

When the emitter 416 is arranged in the shape of a ring (or rings) that surrounds the lens assembly 433, a distance, d, defines the space between the outer surface of the lens assembly 433 and the inner diameter of the emitter 416. A separate distance $D_1$ is the distance from the center of the image sensor 445 (or lens housing 433) to the inner diameter of the emitter 416. A third distance DSS is the distance between the surface of the image sensor 445 and the surface-of-interest along the camera orientation or the longitudinal axis 447 of the lens assembly 433. A fourth distance $d_{offset}$ is the distance between the forward most surface of a substrate or circuit board that supports and distributes the necessary signals to controllably energize individual light-emitting diodes or flashtubes of the emitter 412 and a respective substrate or circuit board associated with emitter 414. This fourth distance is selected in accordance with the physical dimension of the corresponding elements forming the emitter 412 and the emitter 414 in the direction of the longitudinal axis 447 of the lens housing 433 so that a forward most or emitting surface of the respective devices is aligned or is very close to being aligned with the forward most surface of the lens housing 433 so as to reduce the possibility of or even avoid entirely casting a shadow on the surface of interest.

As indicated by a single arrow, polarized light 413 or polarized light 417 is directed away from the emitter 416 of the image-capture device 400 toward the surface-of-interest or subject-of-interest where the reflected light 419 is redirected by an angle, σ, along a vector that is substantially on-axis with the centerline or longitudinal axis 447 of the lens housing 433. In an example embodiment, where the lens assembly 433 has an outer diameter of approximately 87 mm, the distance d is about 1 mm and the image-capture device 400 is about 1 m from the surface-of-interest, the angle σ is approximately 2.5°. The distance between the longitudinal axis 447 and the inner diameter of the emitter 416 can be used in Equation 1 to solve for the angle σ.

$$\sigma° = \tan^{-1}\frac{D_1}{D_{SS}} \qquad \text{Equation 1}$$

When the angle σ is less than about 10° for separation distances of about 1 m or greater, shadows are substantially and significantly reduced in images that include most surfaces-of-interest. When the angle σ is less than about 5° for separation distances of about 1 m or greater, shadows are more significantly reduced in images that include even more surfaces-of-interest in real-world environments. When the angle σ is less than or about 2.5° for separation distances of about 1 m or greater, shadows are avoided in images for nearly all surfaces in a real-world scene. Consequently, images or surface textures including subject matter illuminated in such a manner, that is when the angle σ is less than about 10° for separation distances of about 1 m or greater are substantially shadow free. Thus, the illumination source 410 of the image-capture device 400 illuminates one or more surfaces in a location such that reflected light from the one or more surfaces is substantially shadow free.

Figure 5:
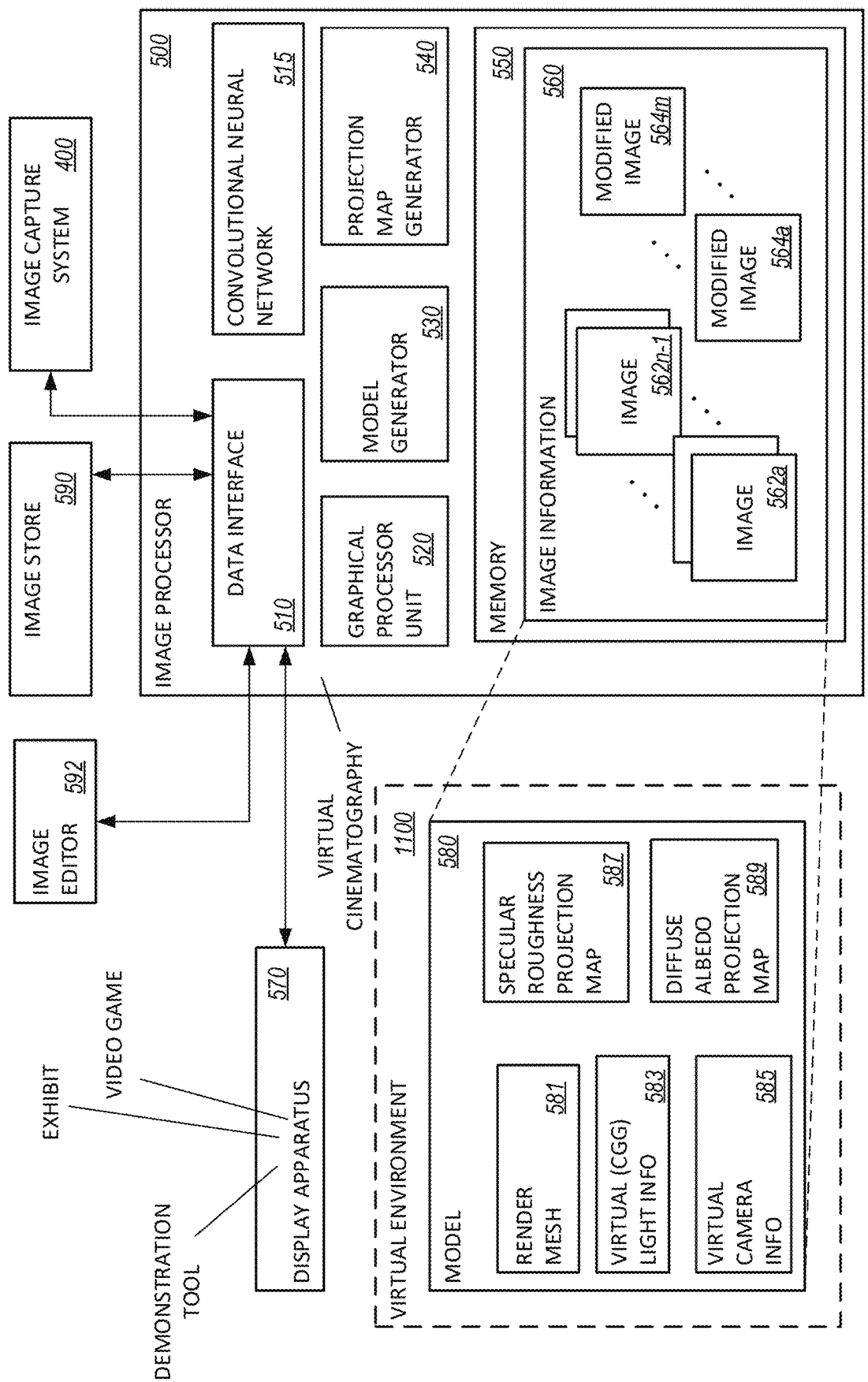
FIG. 5 is a schematic diagram of an embodiment of an image processor that applies information and images from the image-capture system of FIG. 4A to render a virtual environment.

FIG. 5 is a schematic diagram of an embodiment of an image-processing system. The image-processing system includes an image processor 500 that communicates via a data interface 510 with the image-capture system 400, an image store 590, an image editor 592 and a display apparatus 570. The data interface 510 communicates directly or indirectly with each of the image store 590, image editor 592 and display apparatus 570. The data interface 510 may communicate directly with the image capture system 400 using a wired or wireless interface. Alternatively, the data interface 510 may communicate indirectly with the image-capture system 400. In this regard, the data interface 510 may include one or more readers or ports for receiving data from a portable data storage medium such as a secure digital memory card or SD card (not shown).

The image processor 500 includes a convolutional neural network (CNN) 515, a graphical processor unit 520, a model generator 530, a projection map generator 540 and memory 550. The CNN 515 is a learning algorithm which can receive images as inputs, assign importance to various information present in the images and differentiate one from the other. The CNN 515 consists of layers or stages that model neurons arranged in multiple dimensions (e.g., width, height and depth). For two-dimensional color images the CNN 515 receives an array of numbers the size of which depends on the resolution (number of picture elements or pixels and in some arrangements 3 values for each of the R, G, and B channels) of the image and the range of data values assigned by an image sensor to each specific picture element. A first or convolutional layer applies a digital filter including an array of numbers over a respectively sized portion of the image called a receptive field. As the filter is used to convolve the image the image processing system is multiplying the values in the filter with the pixel values in the image. The results of the multiplications are summed to produce an entry in an activation or feature map. One or more filters convolve around the input image and "activate" when the specific feature (e.g., specular reflectivity) is in the image information. A single convolution/filter layer is mentioned above. It should be understood that a traditional CNN architecture includes multiple filters with other layers interspersed between the various convolutional layers. These other layers introduce nonlinearities and preservation of dimension. It should be understood that the input to these subsequent layers is the activation map of the next previous layer. A fully connected layer will output a N dimensional vector where N is the number of classes in the CNN architecture.

To classify or identify a particular imaged surface or surfaces as having a particular SVBRDF, a training data set including training images and a classification or label desired for the images are applied to the CNN. During a training process, randomly initialized weights or filter values for each of the filters will result in an output vector. Early training runs will produce an error. A loss function may be defined by a mean squared error. A typical formula to determine a mean square error is $\frac{1}{2} \times (actual-predicted)^2$. The mean square error is a parameter that reflects the magnitude of the loss. When the variable L is used to define the value of the loss or error of the network, the goal or task of training is to identify a set of weights or filter parameters that lead to the smallest magnitude recorded for the loss L. One way to accomplish this is to determine which weights contributed the most to the loss and adjust the same so that the loss decreases rather than increases. A way to determine that the training is progressing toward the goal of minimizing the loss is to record the derivative of the loss with respect to the adjusted weights. Thereafter, a backward pass through the CNN is performed to determine the weights that contributed the most to the loss and adjust the weights so that the loss decreases. Once the derivative of the loss function is determined, a weight update procedure is performed. During a weight update the separate weights are modified to change in the opposite direction of the gradient. A learning rate is chosen to identify a relative size of the weight adjustment steps. If the adjustment steps are too large it may not be possible to identify the minimal loss. If the adjustment steps are too small it will take a longer time to train the CNN 515. The process of a forward pass, loss function, backward pass and parameter or weight adjustment is one training iteration. The CNN program will repeat the training process for a fixed number of iterations for each set or batch of training images. Thereafter, a separate set of images and labels should be applied through the CNN 515 to compare the "trained" CNN outputs with the actual SVBRDF. Once it has been confirmed that the "trained" CNN 515 generates an output with the actual SVBRDF present in an imaged subject of interest, the CNN 515 can be used along with the above-described first, second and third data sets as may be desired.

The graphical processor unit 520 is an integrated circuit or collection of integrated circuits arranged to process image information such as that provided by the image-capture system 400 or image store 560. The graphical processor unit 520 is arranged to receive the large batches of image information associated with the images 562 and perform the same or similar operations over and over very efficiently. For example, the graphical processor unit 520 is arranged to receive the image pairs such as image pair 562a, 562b and generate a modified image 564a from a difference of a respective data value associated with each pixel in a raster of pixels forming the images 562. As is illustrated in FIG. 5, the modified images 564a through 564m are stored in image information 560 in the memory 550. The graphical processor unit 520 may be arranged to receive instructions from the image editor 592 and work in conjunction with data from one or both of the model generator 530 and the projection map generator 540 to provide data via the data interface 510 to the display apparatus 570.

As further illustrated in FIG. 5, model generator 530, which may be embodied in hardware, firmware, software, or in combinations of these, is arranged to use the image information 560 to generate a model 580 of the real-world scene imaged in the photographically captured and modified images derived therefrom. The model 580, which may be a textured model, includes a render mesh 581, virtual light information 583, virtual camera information 585, specular roughness projection map(s) 587 and diffuse albedo projection map(s) 589. The render mesh 581 includes digital assets, the individual members or files of which are identified by the virtual camera information to apply or overlay one or more appropriate diffuse albedo projection maps 589, and when so desired, one or more appropriate specular roughness projection maps 587 on the polygonal surfaces of the render mesh to generate a three-dimensional color representation of the modeled real-world location. In some embodiments, the render mesh 581 may include both polygonal surfaces and UV maps. As described, a UV map is a two-dimensional surface that can be folded to lie against the polygonal surfaces.

When the model 580 is communicated to a rendering machine associated with display apparatus 570, a virtual environment 1100 (or at least a visual aspect of such an environment) based on a real-world scene 300, is presented to an observer. Such a virtual environment 1100 can be used as a demonstration tool, a teaching aid, as an exhibit in a museum, aquarium or other venue. Such a virtual environment 1100 can provide an interactive session with an observer directing their location and orientation within the virtual environment 1100. The interactive session may be further enhanced by adjustment of the virtual light information 583 provided to the display apparatus 570 via the rendering machine.

The rendering function can be performed within an appropriately supported display apparatus 570. Such a display apparatus 570 may include memory and one or more graphical processors. Creating an image out of binary data is a demanding process. To make a three-dimensional image, the rendering machine or engine, which may be a dedicated graphics card, uses the render mesh to replicate the geometry of the elements or features in the model. Then, the rendering machine applies the projection maps to rasterize or fill the set of pixels available in the display apparatus 570 with fine texture and color. The rendering machine also adds CG lighting to the generated image. For fast-paced games and fully immersive VR, the rendering machine may repeat this process between about forty to sixty times per second.

Rendering may be performed in real-time or offline, and depending on the complexity of the model and the platform or application, the rendering machine may be part of the display apparatus, such as a mobile device or a workstation running a computer game, or in the case of offline rendering of highly complex models, the rendering function may be separate from the display apparatus 570 and performed within the image processor 500. With such an arrangement, the display apparatus 570 may or may not be connected to the image processor 500 by a dedicated data interface and a cable. In case of the latter, the output of the image processor 500 serves as an input to the display apparatus 570 by way of various data distribution systems, independent of a physical data connection and a time constraint.

When the model 580 is accessed by an image editor 592 such as a machine for manipulating image information, video games, movies, exhibits, demonstration aids, virtual cinematography, etc., can be produced, edited, or modified as may be desired. In the case of virtual cinematography and perhaps other applications, the image processor 500 may be used to render, manipulate and store a video product. Such a video product may be distributed to theaters, network access providers or other multi-media distributors via a wired or wireless network or a data storage medium.

Figure 6:
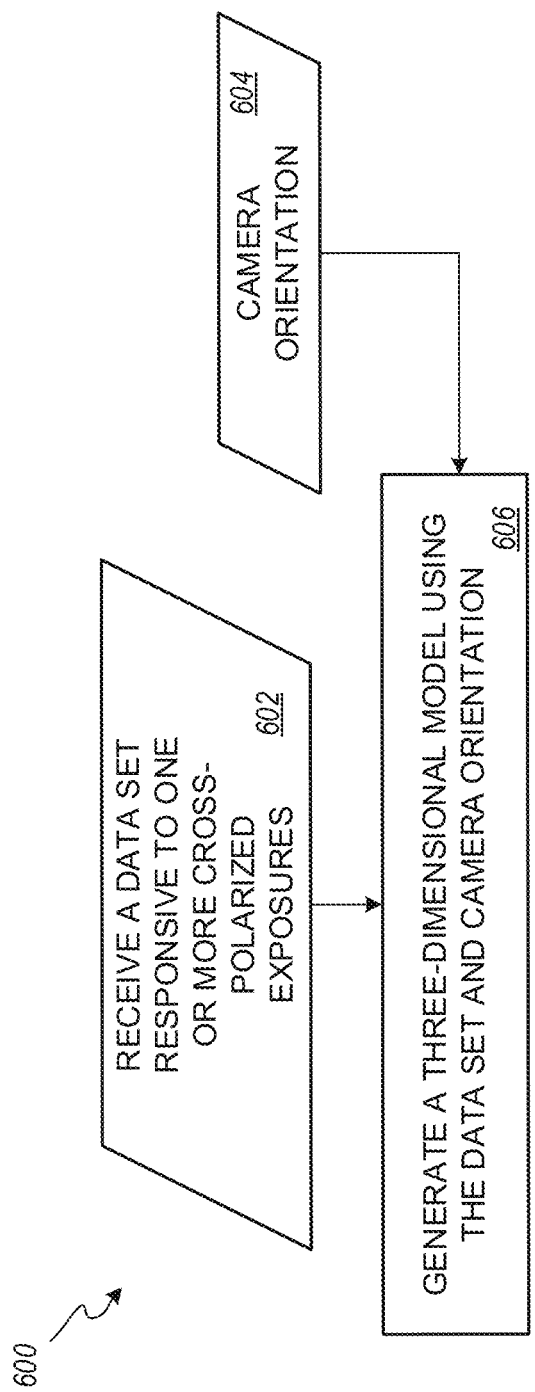
FIG. 6 is a flow diagram illustrating an example embodiment of a method for processing image information captured by the image-capture system of FIG. 4A.

FIG. 6 is a flow diagram illustrating an example embodiment of a method for processing image information captured by the image-capture system of FIG. 4. As indicated by input/output block 604, camera orientation information is received by the image processor 500. As shown by input/output block 602, the method 600 includes the step of receiving a data set of one or more cross-polarized images or exposures. As described, the two-dimensional color information or diffuse albedo surface texture includes diffuse color as well as variations and patterns dependent on the physical properties of the surface and/or subsurface of the photographed subject matter. As shown in block 606, the camera orientation information and data set are used by the image processor 500 to generate a three-dimensional model.

Figure 7:
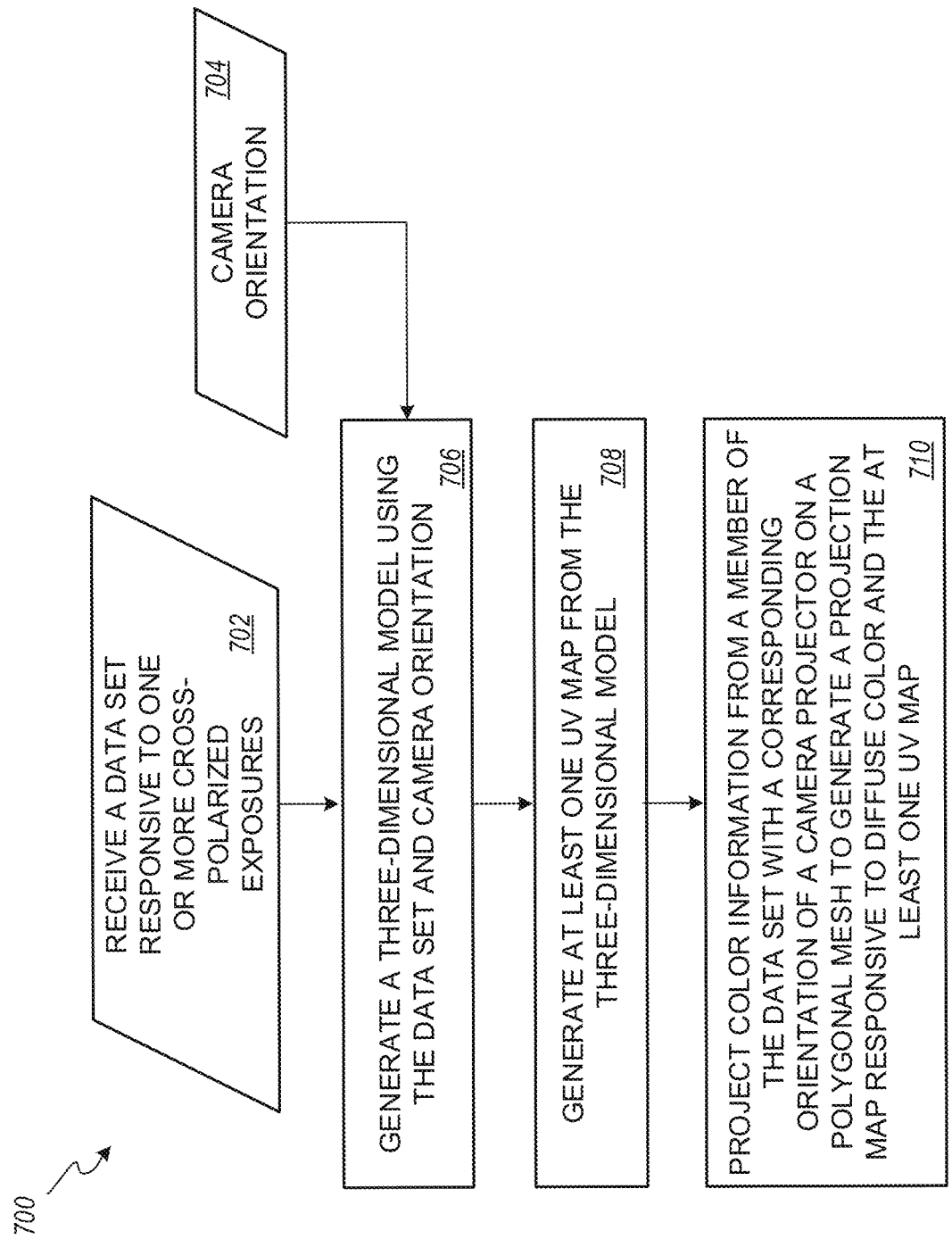
FIG. 7 is a flow diagram illustrating an alternative embodiment of a method for processing image information.

FIG. 7 is a flow diagram illustrating an alternative embodiment of a method 700 for processing image information captured by the image-capture system of FIG. 4. As indicated by input/output block 704, camera orientation information is received by the image processor 500. As shown by input/output block 702, the image processor 500 further receives a data set of one or more cross-polarized images or exposures. As shown in block 706, the camera orientation information and data set are used by the image processor 500 to generate a three-dimensional model. Thereafter, as indicated in block 708, the image processor 500 generates one or more UV maps from the three-dimensional model of the photographed surfaces. As described, the one or more UV maps are two-dimensional closed areas that can be folded to lie along the surfaces defined by a polygonal mesh of the three-dimensional model. After the one or more UV maps are generated, the method continues with block 710 where color information from a member of the data set with a corresponding orientation as that of a camera projector is projected or transferred to the UV map to generate a projection map that includes appropriate color information for the corresponding surfaces of the model.

Figure 8:
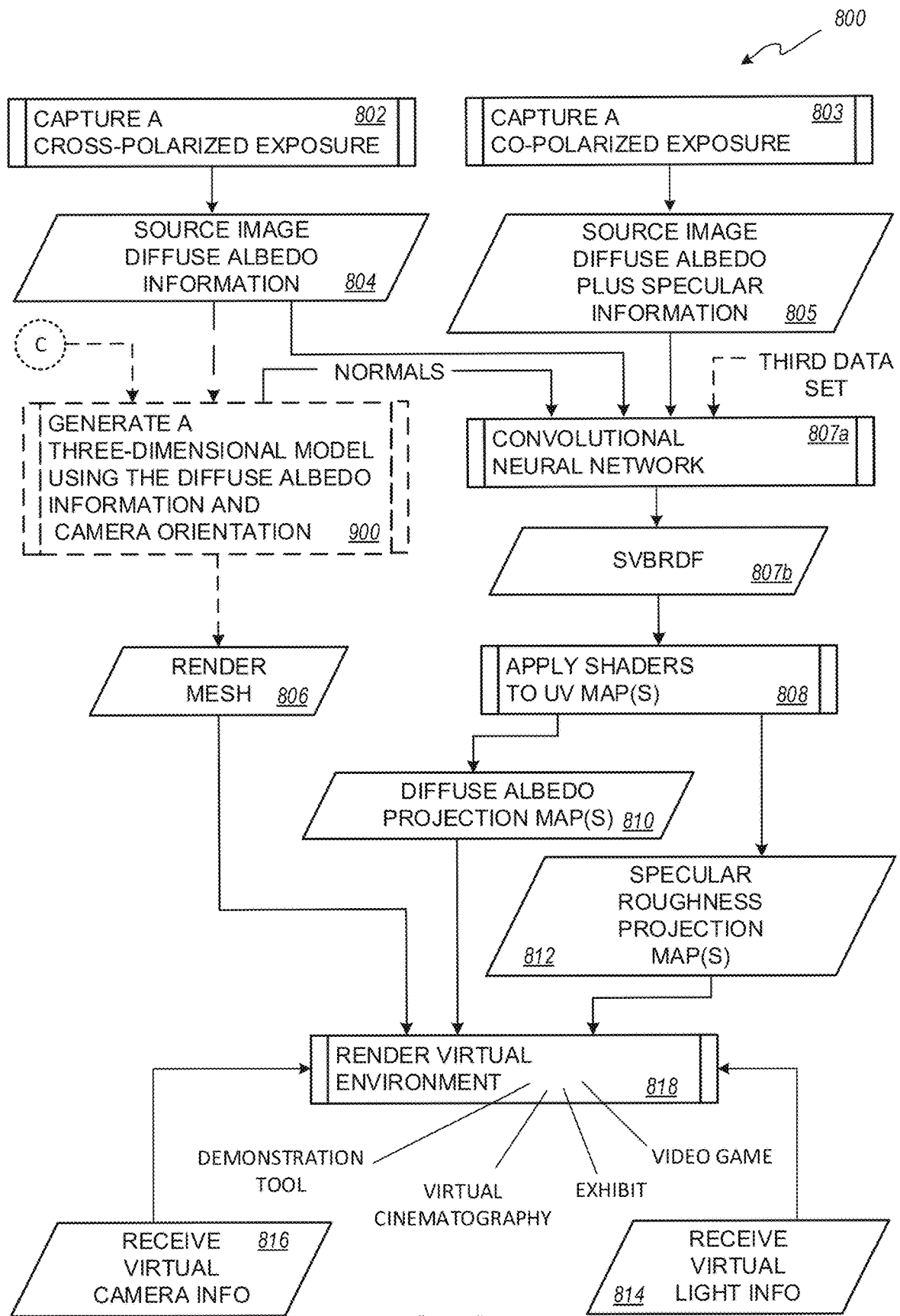
FIG. 8 is a flow diagram illustrating example techniques for rendering a virtual environment.

FIG. 8 includes a flow diagram illustrating example techniques for rendering a virtual environment. The method 800 begins with block 802 and block 803 where a cross-polarized exposure and a co-polarized exposure, respectively, are captured of substantially the same subject matter. As indicated by input/output block 804 a source image including diffuse albedo information is used as an input in an operation/method 900 and is also used as an input to a CNN as indicated by block 807a. As indicated by connector C and the dashed arrow, a camera location and image sensor orientation information may also be applied to the method 900 for generating a three-dimensional model. As indicated in the input/output block 806 in FIG. 8, an output of the three-dimensional model is a render mesh. As illustrated by the input/output block 805, the CNN also receives source image information including both diffuse albedo and specular roughness information. In a first embodiment, the CNN receives source image information from a first data set including cross-polarized exposures, a second data set including co-polarized exposures and normal information from a geometric model and as a result of processing by the CNN provides a SVBRDF as indicated in I/O block 807b. In this first embodiment, the SVBRDF determined from the first and second data sets is applied as an input to a process that applies shaders to UV maps as indicated in block 808. The outputs of block 808 include diffuse albedo projection maps as indicated by I/O block 810 and specular roughness projection maps as shown in I/O block 812. The diffuse albedo projection maps 810 and the specular roughness projection maps 812 are inputs to process block 818 where a virtual environment is rendered.

As further indicated in FIG. 8, these and additional inputs, such as virtual light information from input/output block 814 and virtual camera information from input/output block 816, are forwarded to an image processor 500 where as shown in block 818 a virtual environment is rendered.

In an alternative embodiment, the method of 800 is modified by introducing a third data set of images captured with an image sensor supported by a stationary chassis. The source image information present in the third data set is illuminated by a separate light that traverses the environment being modeled in increments or steps with each repositioning of the light associated with an exposure of the subject or surface of interest. As indicated by the dashed arrow labeled third data set, in this alternative embodiment, an image or images that are captured of substantially the same subject matter or surfaces of interest that appear in the first and second data sets are provided as an optional third input to the CNN 807a. Thereafter, as described above, the CNN 807a generates a SVBRDF 807b that is forwarded to the process for applying shaders to UV maps in block 808.

Figure 13:
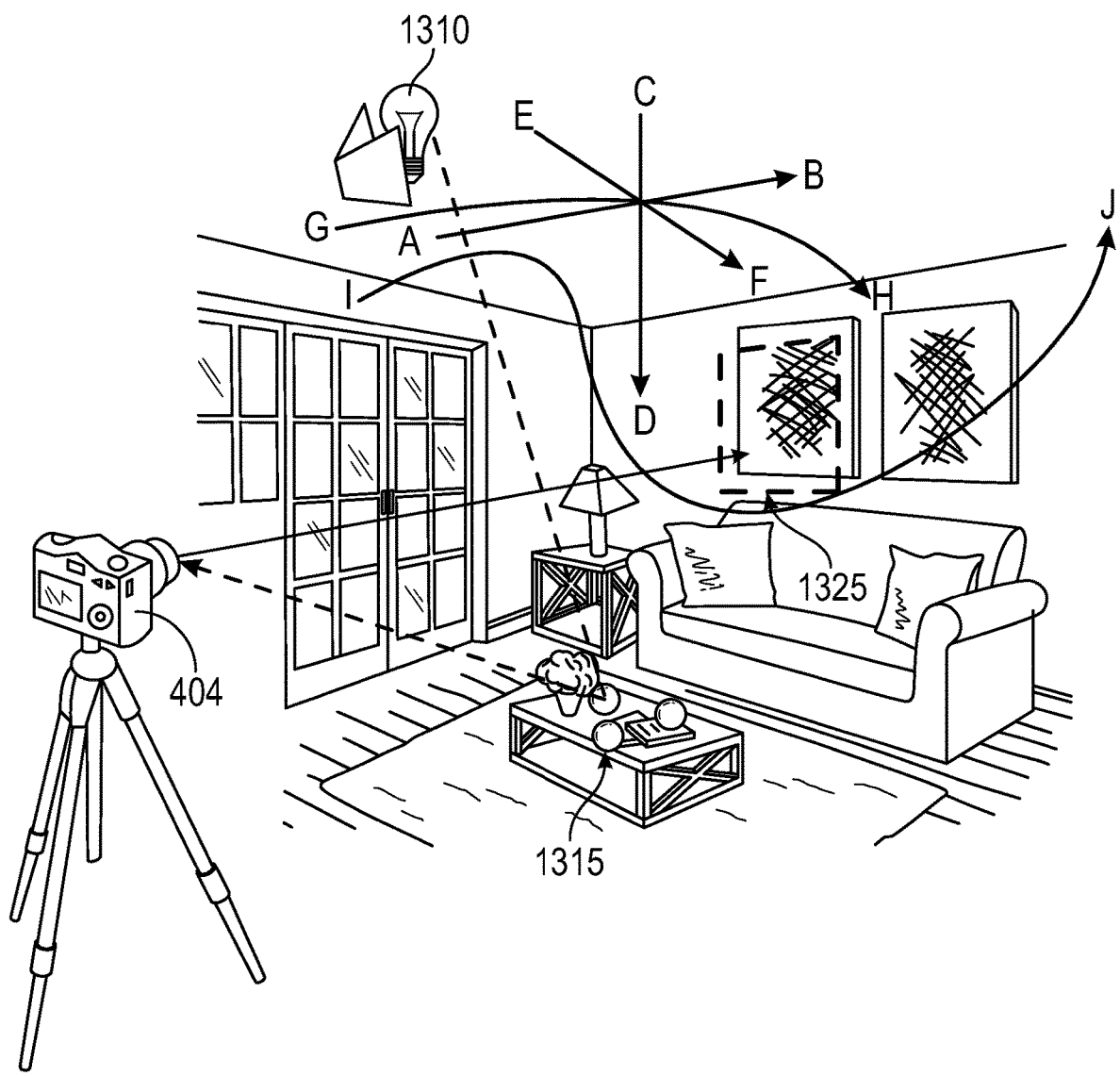
FIG. 13 is a schematic diagram illustrating an alternative embodiment of a real-world scene to be recorded with an image-capture system using novel image-capture techniques.

FIG. 13 schematically illustrates an embodiment of a real-world scene to be recorded with an image-capture system enclosed or supported by a stationary chassis 404 arranged in an orientation to capture a set of exposures of a subject of interest 1325 as a light source 1310 traverses the environment. The stationary chassis 404 housing or supporting an image sensor, may be arranged such that the normal vector of a substantially planar surface of interest 1325 is facing the image sensor. As illustrated in FIG. 13, a set of light probes 1315 may be located at desired locations within the environment. In addition to casting light in the direction of the subject of interest 1325, the light source 1310 will also cast incident light on the highly reflective spherical surfaces of the light probes 1315. The separate specular reflections from the known locations and diameters of the spherical light probes 1315 can be used in conjunction with a known location in the environment of the stationary chassis 404 to determine the location of the light source 1310 specific to each of the captured images.

As illustrated schematically by substantially orthogonally arranged arrows, the light source 1310 may be incrementally repositioned through the environment in a first direction from point A to point B. The light source 1310 may further be incrementally repositioned through the environment in a second direction from point C to point D, where the locations or points C and D define a second direction substantially orthogonal to the first direction. The light source 1310 may also be incrementally repositioned through the environment in a third direction from point E to point F, where the locations E and F define a third direction substantially orthogonal to the first and the second directions. While the light source 1310 is stepped or moved from one or more of points or locations A to B, C to D, or E to F, light cast onto the surface of a subject of interest 1325 is captured in a set of exposures by the image sensor supported by the stationary chassis 404. Each subsequent exposure is captured for each of the positions of the light source 1310.

It should be understood that a suspended wire, support pole, rail or other substantially linear item may be arranged to support the light source 1310 as it is incrementally repositioned along any one of the three substantially orthogonal directions.

Alternatively, the light source 1310 may traverse the environment along a curved path such as that shown by a curved arrow starting from point G and ending at point H, where the curved path is on a plane defined by the directions A to B and E to F. Still further, the light source may traverse the environment along a curved path such as that shown by a curved arrow starting at point I and ending at point J, where the curved path is defined by directions A to B, C to D and E to F.

For relatively more complex surfaces/materials present in the environment such as that illustrated by surface of interest 1325, the number of images or exposures captured for a respective number of positions of the light source along one or more straight paths or one or more curved paths may be increased as light cast by the light source 1310 is reflected by such surfaces.

It should be understood that a suspended rail with one or more arcs, curves, or turns or another substantially curvilinear item may be arranged to support the light source 1310 as it is incrementally repositioned along a desired curved path through the three-dimensional space of a room or other environment to be modeled using the above-described photographic techniques. In some arrangements, a handheld boom might be used to support and reposition the light source 1310.

A set of exposures captured from this perspective of a scene (in the illustrated embodiment a room) is a third data set with image information substantially shared with at least one member of the first data set (a cross-polarized exposure) and at least one member of the second data set (a co-polarized exposure) to relate the image information present in the various data sets.

Figure 9:
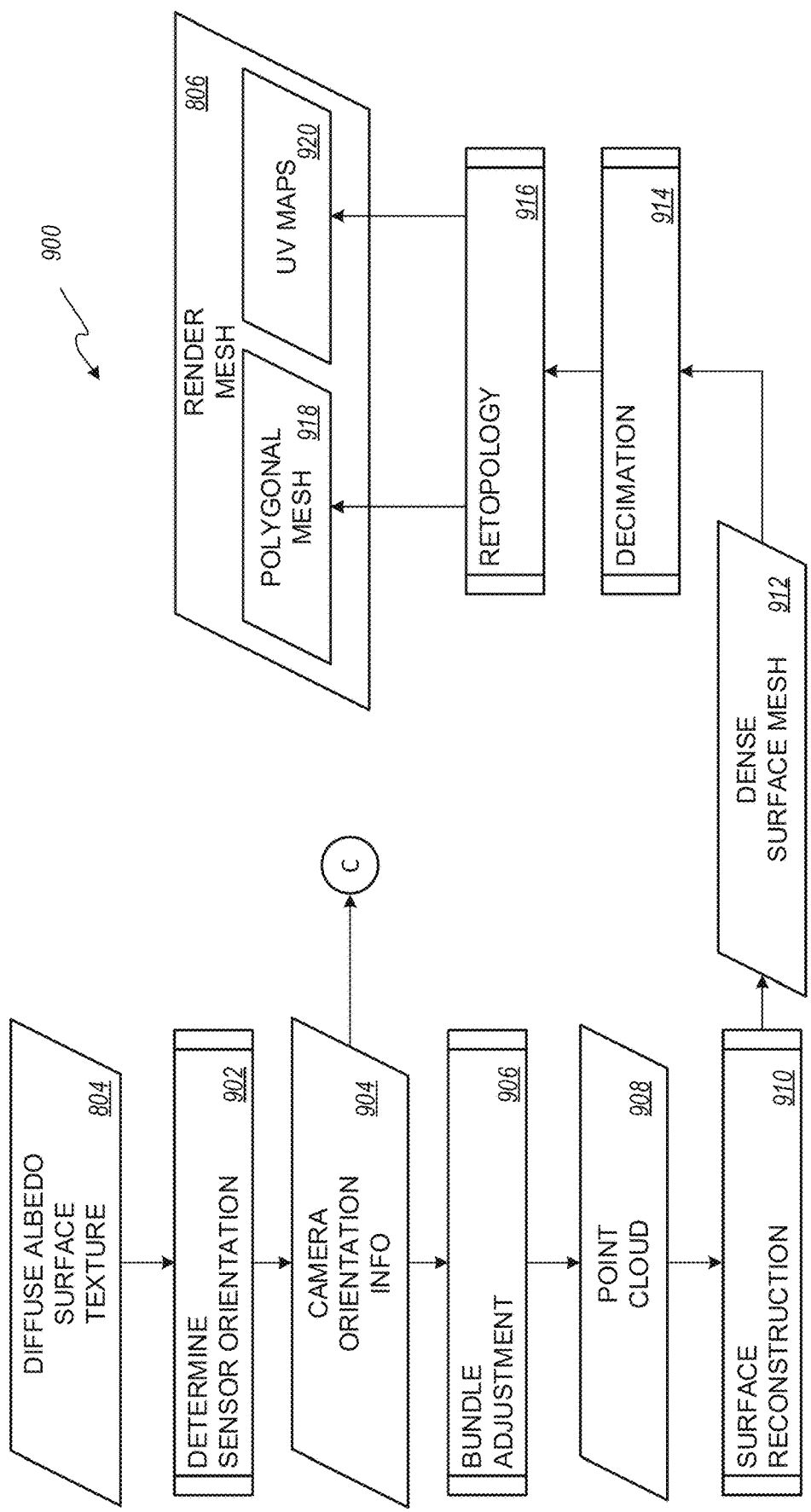
FIG. 9 is a flow diagram illustrating an example method for generating a render mesh as applied in the flow diagram of FIG. 8.

A flow diagram illustrating an example method 900 for generating a render mesh 806 as applied in the flow diagram of FIG. 8 is illustrated in FIG. 9. The method 900 begins with input/output block 804 where a diffuse albedo surface texture is received by a photogrammetry engine. As indicated in block 902, the photogrammetry engine determines a sensor orientation and as shown in input/output block 904, uses the camera orientation information as an input to a bundle adjustment process in block 906. In addition to being used in the bundle adjustment process, the camera orientation information 904 is communicated via connector C to the flow diagram in FIG. 8.

As shown in input/output block 908, the bundle adjustment or alignment produces a point cloud. The point cloud is used as an input to a surface reconstruction process, as shown in block 910. The surface reconstruction process generates a dense surface mesh. This dense surface mesh is a first-generation geometry model derived from the diffuse albedo surface texture and may include flaws, interruptions or other inconsistencies. As indicated in input/output block 912, the dense surface mesh is used as an input to a decimation or sampling process in block 914. The decimated or sampled dense surface mesh data is forwarded to block 916, where a retopology process is performed to correct flaws in the dense surface mesh. As shown in input/output block 806, the result of the retopology process, a second-generation geometry model includes a polygonal mesh 918 and a set of UV maps 920.

Although the illustrated flow diagrams in FIG. 8 and FIG. 9 indicate that a geometrical three-dimensional model of a scene of interest can be generated from the diffuse albedo information from a cross-polarized exposure captured with an image processing system, it should be understood that a geometric model can be generated by scanning systems that deploy LiDAR or patterned light projection techniques to derive the geometry of various surfaces of items present in an environment to be modeled. The dashed arrow from block 900 to the CNN 807a in FIG. 8 indicates that information regarding a geometrical model derived from an alternative scanner may also be provided as an input to a CNN.

As indicated in the flow diagram of FIG. 8, the CNN 807a in one mode of operation receives the diffuse albedo data set from the cross-polarized exposure and the diffuse albedo plus specular data set from the co-polarized exposure as first and secondary inputs to a first embodiment of a CNN. In this embodiment, a first layer algorithm in one or more layers of the CNN is arranged to identify isolated specular information from the latter and filter out any specular information from the former that was not filtered already during cross-polarization (as controlled by the extinction ratio of thin film polarizers). Subsequent layers of the CNN 807a are arranged to estimate the SVBRDF of the scene based on the image information provided by the cross-polarized and co-polarized exposures, as well as by the normals of all faces of the polygonal mesh representing the scene. When the CNN is trained by empirical diffuse albedo and isolated specular information, as well as by the normals of all faces belonging to the polygonal mesh representing the scene, the generated SVBRDF is used to produce the shaders required to augment the empirically recorded color information with hallucinated values for any missing specular roughness information. A still further algorithm or CNN layer then maps or associates diffuse albedo and specular roughness shaders to respective UV maps to generate the diffuse albedo projection map(s) and specular roughness projection map(s) that can be forwarded to a rendering process to generate a virtual environment.

As described above, normal information from the geometric model, however determined, is used by the CNN with the identified SVBRDF to produce the shaders required to augment the empirically recorded color information with hallucinated values for any missing specular roughness information.

In a first mode of operation the geometric model can be determined from the diffuse albedo information. In this first mode, the CNN 807a receives the source image albedo information from I/O block 804 and the source image diffuse plus specular information as indicated by I/O block 805. In this first mode the normal information determined from the diffuse albedo information is coupled with the identified SVBRDF to produce the shaders required to augment the empirically recorded color information in with hallucinated values for any missing specular roughness information.

In a second mode of operation the geometric model can be determined from an alternative scanner. In this second mode, the CNN 807a receives the source image albedo information from I/O block 804 and the source image diffuse plus specular information as indicated by I/O block 805 along with the normal information from the geometric model, as indicated by the arrow, labeled "normals" in FIG. 8, shown entering the CNN 807a. In this second mode, the normal information from a geometric model determined from other than source image albedo information is coupled with the identified SVBRDF (as determined in the CNN) to produce the shaders required to augment the empirically recorded color information with hallucinated values for any missing specular roughness information.

In a third mode of operation the geometric model can be determined from an alternative scanner. In this third mode, the CNN 807a receives the source image albedo information from I/O block 804 and the source image diffuse plus specular information as indicated by I/O block 805, the above-described third data set shown by the dashed arrow, labeled "third data set" and the normal information from the geometric model as indicated by the arrow, labeled "normals" as depicted in FIG. 8 entering the CNN 807a. In this third mode, the normal information from a geometric model determined from other than source image albedo information is coupled with a further refined SVBRDF (as determined by the three separate image sets provided to the CNN) to produce the shaders required to augment the empirically recorded color information with hallucinated values for any missing specular roughness information.

In a fourth mode of operation the geometric model can be determined from the diffuse albedo information. In this fourth mode, the CNN 807a receives the source image albedo information from I/O block 804 and the source image diffuse plus specular information as indicated by I/O block 805, as well as the above-described third data set shown by the dashed arrow, labeled "third data set". In this fourth mode, the normal information from a geometric model determined from the source image albedo information is coupled with a further refined SVBRDF (as determined by the three separate image sets provided to the CNN) to produce the shaders required to augment the empirically recorded color information with hallucinated values for any missing specular roughness information.

Figure 10:
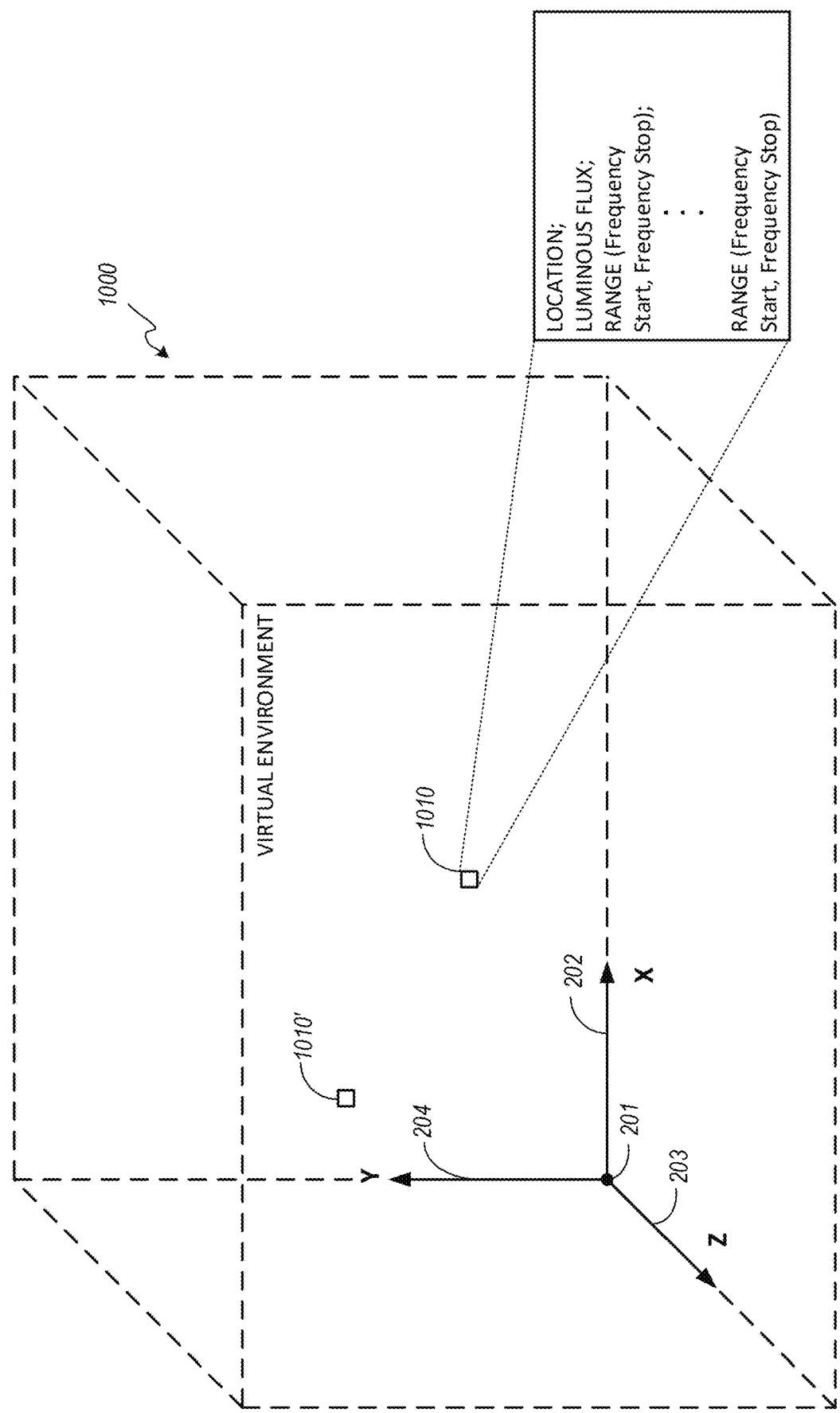
FIG. 10 is a schematic diagram of an embodiment of a virtual environment produced with the image processor of FIG. 5.

FIG. 10 is a schematic diagram of an embodiment of a virtual environment 1000 produced with the image-processing system 500 of FIG. 5. A CG or virtual light source 1010 is introduced in the virtual environment 1000 and manipulated by selecting a source position or source location identified by coordinates in a three-dimensional coordinate space or by a vector and a distance from a reference in the modeled volume. As indicated in the insert, the virtual light source 1010 is further identified by a luminous flux, and a range of frequencies. When so desired, the virtual light source 1010 can be relocated to an alternative source location 1010' within the virtual environment 1000. Additional signals may be applied to the image-processing system 500 to enable a visual effect or multiple visual effects in association with characteristics defining the virtual light source 1010'. These may include the introduction of one or more reflective surfaces to produce a virtual flashlight or in the case of a candle or fire varying the luminous flux over time to simulate a flickering flame as may be desired.

Figure 11:
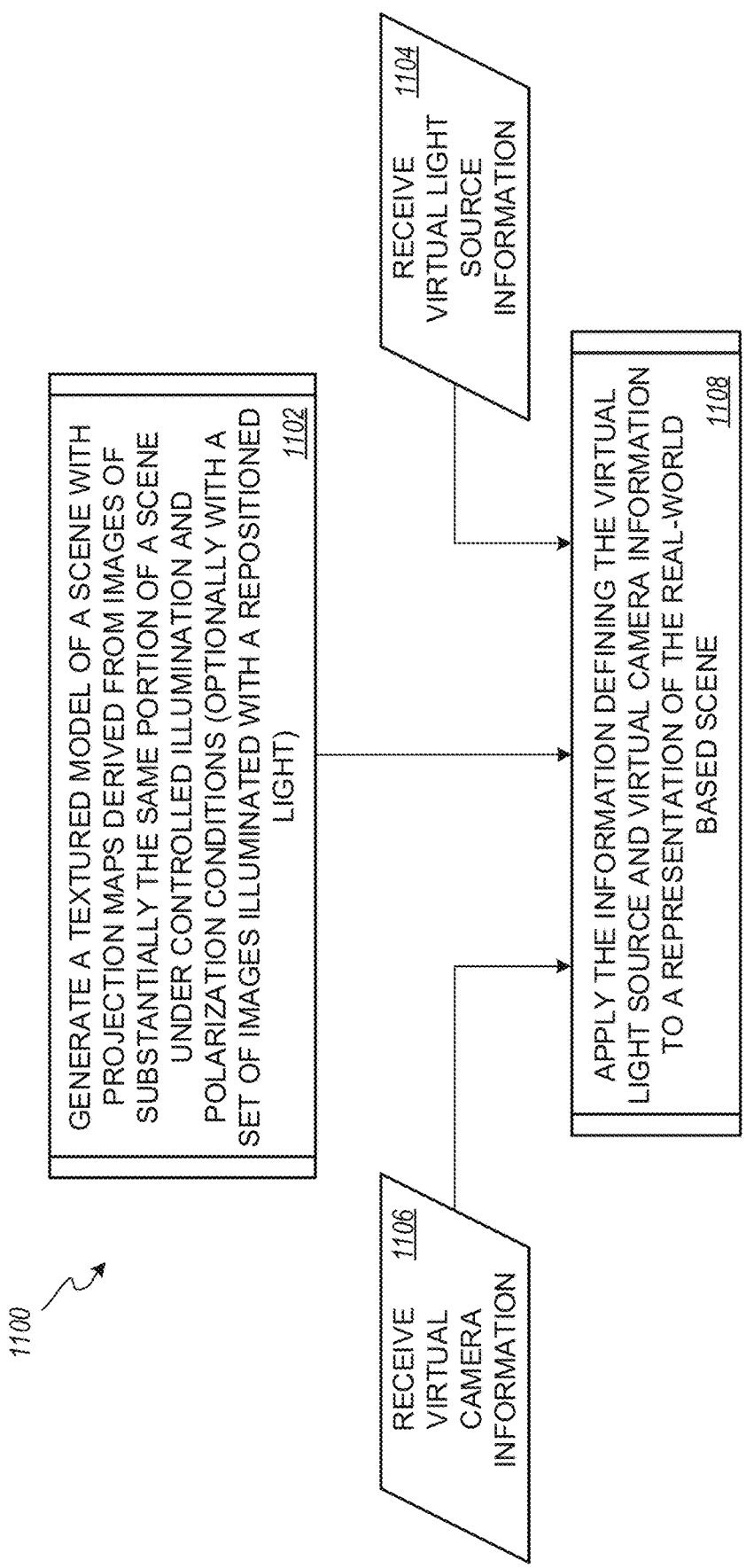
FIG. 11 is a flow diagram illustrating an example embodiment of a method for manipulating a computer graphics generated light source in a virtual environment generated from a textured model created from diffuse albedo and specular roughness projection maps.

FIG. 11 is a flow diagram illustrating an example embodiment of a method 1100 for manipulating a computer graphics generated or virtual light source 1010 in a virtual environment 1000. The method 1100 begins with block 1102 where a geometric model such as a point cloud representation of a three-dimensional real-word based scene generated from LiDAR information, images from a third data set (illuminated by a repositioned light source that traverses a path across the set of exposures) or from diffuse albedo information from a set of cross-polarized images illuminated with a substantially on axis light source is "textured" by the application of diffuse albedo projection map(s) and specular roughness projection map(s). A SVBRDF determined by a CNN can be applied as an input to a procedure to apply shaders to UV maps. This procedure generates improved diffuse albedo projection map(s) and specular roughness projection map(s) which can be used to generate a textured model. This textured 3-D model is used as an input to block 1108.

As shown in input/output block 1104, information defining or identifying a virtual light source or a computer graphics generated light source is received. As shown in input/output block 1106, information defining a virtual camera is received. Thereafter, as shown in block 1108, the information defining the virtual light source and information defining the virtual camera are applied to the representation of the real-world based scene to reveal the effects of a virtual light source on the reflective, translucent and transparent surfaces of the rendered representation of the modeled scene.

When rendering a virtual environment from a model of a real-world scene, a rendering engine takes into account various settings for controls in a virtual camera which correspond to many of the features and controls present in real cameras. As a starting point, whereby a real camera is located somewhere in a three-dimensional coordinate space and is pointed in a direction, settings for translation and rotation in the virtual camera serve a similar end and can be animated over time to mirror camera movement in the real world. In the case of video games and VR, various inputs from a user allow one to navigate and observe from any angle a virtual environment at will using real-time rendering engines.

As with a real camera, a virtual camera assumes a lens with a given focal length and an aspect ratio. Whether using a default or set to a desired focal length or field of view, controls exist in virtual cameras for mimicking their real-world wide angle and deeper lens counterparts. Animating by changing from a shorter focal length to a relatively longer focal length over time results in the effect of zooming in from wide to close up.

As with real cameras, a virtual camera assumes a frame rate and a shutter speed, these parameters accounting for the sampling rate at which camera movement or changes in the environment are updated in the rendering engine, this also determining the temporal resolution per frame.

It should be noted that the term "comprising" does not exclude other elements or steps and the article "a" or "an" does not exclude a plurality. Also, elements described in association with different embodiments may be combined.

Implementation of the invention is not limited to the preferred embodiments shown in the figures and described above. Instead, a multiplicity of variants is possible which use the solutions shown and the principles according to the invention even in the case of fundamentally different embodiments.

| Reference Numbers Introduced in Exemplary Embodiments | |
|---|---|
| 100 | electromagnetic spectrum |
| 110 | abscissa (wavelength) |
| 120 | abscissa (frequency) |
| 130 | visible light |
| 200 | real-world scene |
| 201 | origin |
| 202 | abscissa (X-axis) |
| 203 | Z-axis |
| 204 | ordinate (Y-axis) |
| 210 | point cloud (local) |
| 215 | polygonal mesh (local) |
| 300 | real-world scene (portion) |
| 310 | surface(s) of interest |
| 320 | image frustum |
| 330 | vehicle (airborne) |

-continued

Reference Numbers Introduced in Exemplary Embodiments

| | |
|---|---|
| 340 | pole |
| 342 | pole section |
| 345 | adjustment mechanism |
| 350 | flexible elongate member |
| 352 | first end |
| 354 | opposed end |
| 360 | carriage support |
| 400 | image-capture system |
| 402 | freestanding chassis |
| 404 | stationary chassis |
| 410 | illumination source |
| 412, 414, 416 | emitter |
| 413 | non-polarized light |
| 415 | polarizer |
| 417 | polarized/co-polarized light |
| 419 | reflected light |
| 420 | illumination controller |
| 425 | scanner subsystem |
| 430 | optical subsystem |
| 432 | polarizer |
| 433 | lens assembly |
| 434 | aperture |
| 440 | shutter |
| 442 | cross-polarized light |
| 445 | image sensor (array) |
| 447 | center line |
| 450 | processor |
| 462 | image information (pairs) |
| 465 | mesh store |
| 500 | image processor |
| 510 | data interface |
| 515 | convolutional neural network |
| 520 | graphical processor unit |
| 530 | model generator |
| 540 | projection map generator |
| 550 | memory |
| 560 | image information |
| 562 | image pairs |
| 564 | modified image |
| 570 | display apparatus |
| 580 | model |
| 581 | render mesh |
| 583 | virtual light information |
| 585 | virtual camera information |
| 587 | specular roughness proj. map |
| 589 | diffuse albedo projection map |
| 590 | image store |
| 592 | image editor |
| 600 | method for processing info |
| 602 | input operation |
| 604 | input operation |
| 606 | execute operation |
| 700 | alternative method |
| 702 | input operation |
| 704 | input operation |
| 706 | execute operation |
| 708 | execute operation |
| 800 | method for rendering a VE |
| 802 | image capture process |
| 803 | image capture process |
| 804 | input operation |
| 805 | input operation |
| 806 | input/output operation |
| 807a | CNN operation |
| 807b | generate operation |
| 808 | map/shader operation |
| 810 | output operation |
| 812 | output operation |
| 814 | input operation |
| 816 | input operation |
| 818 | render operation |
| 900 | method for modeling |
| 902 | execute operation |
| 904 | input/output operation |
| 906 | execute operation |
| 908 | input/output operation |
| 910 | execute operation |

-continued

Reference Numbers Introduced in Exemplary Embodiments

| | |
|---|---|
| 912 | input/output operation |
| 914 | execute operation |
| 916 | execute operation |
| 918 | output operation |
| 920 | output operation |
| 1000 | virtual environment |
| 1010 | virtual light source |
| 1010' | translated VLS |
| 1100 | method for manipulating a virtual environment |
| 1102 | execute operation |
| 1104 | input operation |
| 1106 | input operation |
| 1108 | execute operation |
| 1200 | light |
| 1202 | two-headed arrow |
| 1204 | two-headed arrow |
| 1205 | intersection |
| 1210 | polarizing film |
| 1215 | polarizing film |
| 1220 | polarized light |
| 1225 | polarized light |
| 1227 | unit circle |
| 1310 | light source |
| 1315 | light probe |
| 1325 | surface of interest |

I claim:

1. A method for processing image information, the method comprising:
receiving a first data set representative of a cross-polarized image of a scene, wherein subject matter is illuminated to substantially avoid shadows in the cross-polarized image to provide a diffuse albedo surface texture;
receiving a second data set representative of a co-polarized image of substantially the same scene illuminated to substantially avoid shadows in the co-polarized image; and
using the first and second data sets to train a convolutional neural network configured to derive a spatially varying bidirectional reflectance distribution function (SVBRDF) representative of one or more materials in the scene, wherein the SVBRDF is used to produce a refined diffuse albedo surface texture and a specular roughness surface texture.

2. The method of claim 1, further comprising:
using the first and second data sets, the spatially varying bidirectional reflectance distribution function, and a sensor orientation to generate a UV map; and
receiving information representative of a surface geometry of the subject matter, wherein using the first and second data sets further includes applying color information from the data set over the surface geometry.

3. The method of claim 2, further comprising:
generating a virtual environment from the surface geometry of the subject matter and the UV map;
receiving a preferred orientation; and
modifying the virtual environment in response to the preferred orientation.

4. The method of claim 3, wherein the virtual environment is used in a product selected from the group consisting of an exhibit, video game, cinematic production, and a teaching aid.

5. The method of claim 4, wherein information characterizing the virtual light source includes one or more of identifying a location, a luminous flux, and a frequency range.

6. The method of claim 3, further comprising:
receiving information characterizing a virtual light source; and
modifying the virtual environment in response to the virtual light source and the preferred orientation.

7. The method of claim 1, wherein the first and the second data sets are captured with an image sensor coupled to a freestanding chassis.

8. The method of claim 7, wherein the stationary image sensor is located and oriented to capture images of a substantially planar surface present in a field of view, a normal of the planar surface substantially facing the image sensor.

9. The method of claim 1, wherein the first data set and the second data set include subject matter illuminated with a controlled illumination source arranged about a perimeter of an image sensor.

10. The method of claim 1, further comprising:
using the first and second data sets, the SVBRDF, and a sensor orientation to generate a UV map; and
receiving information representative of a surface geometry of the subject matter, wherein using the first and second data sets further includes applying color information from the data set over the surface geometry.

* * * * *